US006963892B2

(12) United States Patent
Jin et al.

(10) Patent No.: US 6,963,892 B2
(45) Date of Patent: Nov. 8, 2005

(54) REAL-TIME METHOD AND APPARATUS FOR PERFORMING A LARGE SIZE FAST FOURIER TRANSFORM

(75) Inventors: Dongxing Jin, Ottawa (CA); Ping Wan, Kanata (CA); Leonard Marziliano, Hull (CA)

(73) Assignee: Tropic Networks Inc., Kanata (CA)

( * ) Notice: Subject to any disclaimer, the term of this patent is extended or adjusted under 35 U.S.C. 154(b) by 644 days.

(21) Appl. No.: 10/025,870

(22) Filed: Dec. 26, 2001

(65) Prior Publication Data

US 2003/0120692 A1 Jun. 26, 2003

(51) Int. Cl.[7] .............................................. F06F 15/00
(52) U.S. Cl. ...................................... 708/404; 708/403
(58) Field of Search ................................ 708/400, 403, 708/404, 405

(56) References Cited

U.S. PATENT DOCUMENTS

| | | | | |
|---|---|---|---|---|
| 3,617,720 A | * | 11/1971 | Gentleman | 708/404 |
| 5,029,079 A | * | 7/1991 | Magar et al. | 708/404 |
| 5,091,875 A | * | 2/1992 | Wong et al. | 708/404 |
| 6,115,728 A | * | 9/2000 | Nakai et al. | 708/404 |
| 6,247,034 B1 | * | 6/2001 | Nakai et al. | 708/409 |
| 6,356,926 B1 | * | 3/2002 | Andre | 708/404 |
| 6,421,696 B1 | * | 7/2002 | Horton | 708/404 |
| 6,430,149 B1 | * | 8/2002 | Kobayashi | 708/404 |
| 2001/0051967 A1 | * | 12/2001 | Jaber | |
| 2003/0225806 A1 | * | 12/2003 | Hu et al. | |

OTHER PUBLICATIONS

Brad Hamilton, Programmable arichtecture for matrix and signal processing, 1988, IEEE, pp. 116-120.*

* cited by examiner

Primary Examiner—Kakali Chaki
Assistant Examiner—Chat C. Do
(74) Attorney, Agent, or Firm—Victoria Donnelly

(57) ABSTRACT

A method and apparatus for performing a fast Fourier transform (FFT) computation on large data sizes in real time is provided. The speed at which a FFT is performed is increased by reducing the number of times a Direct Memory Access (DMA) unit must transfer data between an internal memory and an external memory. This is achieved through an algorithm in which data is imported from the external memory into the internal memory and having the CPU perform several calculations on the imported data before it is exported back to the external memory. The imported data in the internal memory has a structure that results in a reduction of the number of times the imported data is swapped between different layers of the internal memory during the FFT computation. Furthermore, the DMA unit import/exports data between the internal memory and the external memory while at the same time having the CPU perform calculations on other data in the internal memory.

14 Claims, 22 Drawing Sheets

REAL-TIME METHOD AND APPARATUS FOR PERFORMING A LARGE SIZE FAST FOURIER TRANSFORM

FIELD OF THE INVENTION

This invention relates to signal processing, and more particularly to frequency analysis of signals.

BACKGROUND OF THE INVENTION

A common task in signal processing is to determine a frequency spectrum of a received signal, given a signal sampling in the time domain. In Digital Signal Processing, discrete samples of the signal are taken in time. A Discrete Fourier Transform is applied to the samples, and the frequency spectrum is calculated. The frequency spectrum is also discrete, each value indicating the contribution of a different frequency bin to the signal.

For N time domain samples, the execution time of the Discrete Fourier Transform for N frequency domain samples is on the order of $N^2$. The determination of the frequency spectrum can be vastly accelerated using a Fast Fourier Transform (FFT). The execution time of the FFT is proportional to $N \log_2 N$. The proportionality factors are of the same order of magnitude, so even for a sample size as low as 1000 samples the FFT is about 100 times faster than the Discrete Fourier Transform. For this reason, the FFT is a critical tool in determining the frequency spectrum of most practical signals.

The FFT achieves this speed advantage by effectively breaking the analysis down into a series of smaller analyses, and reconstructing the results. The FFT is faster because n analyses of two samples is faster than one analysis of 2 n samples. The FFT is performed in two steps: decomposition and synthesis. (There is a third, intermediate step of frequency determination, but nothing is done at this step other than realizing that each time sample now represents a frequency sample. No calculations are carried out.) In the decomposition step additional samples having a value of 0 are added to the signal as necessary in order that the resulting signal has $N=2^k$ samples, with k being a whole number. The signal of N samples is then decimated repeatedly, leaving N signals of one sample each. As part of the decimation, the samples are reordered in a particular manner.

In the synthesis step, the N signals of one sample (which now represent frequencies) are repeatedly combined in pairs until a single signal of N frequency samples is obtained. The resulting single signal is the frequency spectrum of the original signal. The combination of frequency signals occurs in stages. At each stage, the number of signals is halved and the number of samples in each signal is doubled, so a signal having N samples will require $\log_2 N$ stages during the synthesis step. During each stage, larger size signals (called blocks) are generated in turn. Within each block, new frequency samples are generated in turn from two frequency samples, one from each of two lower size signals, using a butterfly calculation. All frequency samples within a block are generated from frequency samples from the same two lower size blocks. After $\log_2 N$ stages, the N signals of one frequency sample will have been combined into a single signal of N frequency samples.

Unfortunately, for large data sizes even the FFT may be too slow, especially for real-time applications. With the rapid increase in processor speed, multiprocessor platforms using parallel processing to achieve sufficient speed for real-time applications can in theory be replaced with less expensive single processor platforms. However single processor platforms are still limited by the speed of peripherals, such as a Direct Memory Access (DMA) unit. The slowness arises not from the number of calculations, but from communication bottlenecks within the platform. The large number of samples can not all be stored in internal memory (such as IDRAM (Internal Dynamic Random Access Memory)), but rather must be stored in external memory (such as SDRAM (Synchronous Dynamic Random Access Memory)).

A processor performing the FFT must import a limited amount of data across a bus into internal memory, perform part of the FFT to produce new data, and export the new data to external memory. Typically, the processor performs one butterfly calculation at a time to generate one new frequency sample. This requires one import and one export of data per butterfly calculation, or $(N \log_2 N)/2$ imports and exports per synthesis. Despite the speed of the processor, the memory access time will constrain the speed of the FFT for large sample sizes in which much data must be exchanged between external and internal memory.

SUMMARY OF THE INVENTION

Various methods and apparatus for performing a fast Fourier transform (FFT) computation on large data sizes in real time are provided. The speed at which a FFT is performed is increased by reducing the number of times a Direct Memory Access (DMA) unit must transfer data between an internal memory and an external memory. This is achieved through an algorithm in which data is imported from the external memory into the internal memory and having the CPU perform several calculations on the imported data before it is exported back to the external memory. The imported data in the internal memory has a structure that results in a reduction of the number of times the imported data is swapped between different layers of the internal memory during the FFT computation. Furthermore, the DMA unit import/exports data between the internal memory and the external memory while at the same time having the CPU perform calculations on other data in the internal memory.

In accordance with a first broad aspect of the invention, provided is a method of performing a k-stage FFT computation of N data points wherein k and N are integers. The method includes performing a number of operations upon the N data points. For each one of the operations, respective sets of data points of the N data points are imported from an external memory into an internal memory. A FFT computation of the k-stage FFT computation is then performed upon each one of the respective sets of data points in the internal memory. The respective sets of data points of the N data points are then exported from the internal memory into the external memory. This is done to update the respective sets of data points of the N data points in the external memory.

In accordance with another broad aspect of the invention, provided is a method of performing a k-stage FFT computation of N data points wherein k and N are integers. The k-stages are grouped into a number of stage groupings of at least one stage. For each one of the stage groupings, a number of respective operations are performed on the N data points. For each operation respective sets of data points of the N data points are imported from an external memory into an internal memory. A FFT computation is then performed upon each one of the respective sets of data points of the N data points in the internal memory. The respective sets of data points of the N data points are then exported from the internal memory into the external memory. This is done to update the respective sets of data points of the N data points in the external memory.

In some embodiments, other sets of data points of the N data points for a next iteration may be imported into the internal memory while FFT computations are being performed upon each one of the respective sets of data points of the N data points in the internal memory. Furthermore, sets of data points of the N data points from a previous iteration may be exported from the internal memory while FFT computations are being performed upon each one of the respective sets of data points of the N data points in the internal memory.

In some embodiments, N may satisfy $N=2^k$. In such embodiments, there may be Q stage groupings each having S stages wherein Q and S may be integers with integers with $Q \geq 1$, $S \geq 1$ and $k \geq QS$. Furthermore, within a stage grouping, I, of the Q stage groupings wherein I may be an integer satisfying $0 \leq I \leq Q-1$, the N data points may be grouped into $2^{IS}$ blocks of data of $N/2^{IS}$ respective data points. Within each one of the $2^{IS}$ blocks of data, the $N/2^{IS}$ respective data points may also be grouped into $2^S$ sub-blocks of data of $N/2^{IS+S}$ respective data points. Within each one of the $2^S$ sub-blocks of data, the $N/2^{IS+S}$ respective data points may be grouped into $M_1$ sub-sub-blocks of data of $N/(2^{IS+S}M_1)$ respective data points wherein $M_1$ may be an integer. Within each one of the $2^{IS}$ blocks of data, a respective sub-sub-block of data of the $M_1$ sub-sub-blocks of data may be taken from each one of the $2^S$ sub-blocks of data to maybe form a set of $2^S$ sub-sub-blocks of data of $N/(2^{IS}M_1)$ data points. This may be done a total of $M_1$ times to produce $M_1$ sets of $2^S$ sub-sub-blocks of data of $N/(2^{IS}M_1)$ data points. Within each one of the $M_1$ sets of $2^S$ sub-sub-blocks of data, a respective data point may be taken from each one of the $2^S$ sub-blocks of data to maybe form a set of $2^S$ data points. This may be done a total of $N/(2^{IS+S}M_1)$ times to maybe produce $N/(2^{IS+S}M_1)$ sets of $2^S$ data points.

Within each stage grouping, I, $M_1$ of the operations may be performed for each one of the $2^{IS}$ blocks of data within the stage grouping, I. Furthermore, for each one of the $M_1$ of the operations, respective $N/(2^{IS+S}M_1)$ sets of $2^S$ data points may be imported from the external memory into the internal memory. An S-stage FFT computation of the k-stage FFT computation may then be performed upon each set of $2^S$ data points of the respective $N/(2^{IS+S}M_1)$ sets of $2^S$ data points in the internal memory. The respective $N/(2^{IS+S}M_1)$ sets of $2^S$ data points may then be exported from the internal memory into the external memory to update the respective $N/(2^{IS+S}M_1)$ sets of $2^S$ data points in the external memory.

In other embodiments of the invention, one of the stage groupings may have D stages wherein D may be an integer and k may satisfy $k=QS+D$. In such embodiments, the internal memory may have a buffer, for storing data points, with a capacity to hold $M_I$ data points and D may satisfy $D \leq \log_2(M_I)$. Furthermore, the internal memory may have a double buffer having two buffers for storing data points. Each one of two buffers may have a capacity to hold $M_I/2$ data points and D may satisfy $D \leq \log_2(M_I/2)$.

In accordance with another broad aspect of the invention, provided is a processor. The processor has an internal memory used to store data. The processor also has a DMA (direct memory access) unit and a central processor unit (CPU). The DMA unit is used to import data into the internal memory and to export data from the internal memory. The k-stages of the of the k-stage FFT computation are grouped into a number of stage groupings of at least one stage and for each one of the stage groupings the CPU is used to perform a number of respective operations on the N data points. Furthermore, for each one of the respective operations the CPU is used to: 1) provide instructions to the DMA unit for importing respective sets of data points, of N data points, into the internal memory; 2) perform a FFT computation upon each one of the respective sets of data points, of the N data points, in the internal memory; and 3) provide instructions to the DMA unit for exporting the respective sets of data points, of the N data points, from the internal memory. This may be done to update the respective sets of data points of the N data points.

The processor may have an external memory that may be used to store the N data points. In some embodiments, the processor may also have one or more buses. In such embodiments, any data may be imported and exported through the buses. Furthermore, in some embodiments, the processor may have a double buffer having two buffers and the processor may also have two buses, one for each of the two buffers. The CPU may instruct the DMA unit to import a set of data points which will be operated on in a next iteration while the CPU performs FFT computations on other sets of data points. In addition, the CPU may instruct the DMA unit to export a set of data points from a previous iteration while the CPU performs FFT computations on other sets of data points.

In accordance with yet another broad aspect of the invention, provided is an article of manufacture. The article of manufacture has a computer usable medium having computer readable program code for performing a k-stage FFT computation of N data points. k and N are integers and k stages of the k-stage FFT computation are grouped into a plurality of stage groupings each having at least one stage. The computer readable program code is used to perform, for each one of the stage groupings, a number of respective operations on the N data points. Furthermore, for each one of the operations, the computer readable program code has further computer readable program code used to: 1) provide instructions for importing respective sets of data points of the N data points from an external memory into an internal memory; 2) perform a FFT computation upon each one of the respective sets of data points of the N data points in the internal memory; and 3) provide instructions for exporting the respective sets of data points of the N data points from the internal memory into the external memory.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1A:
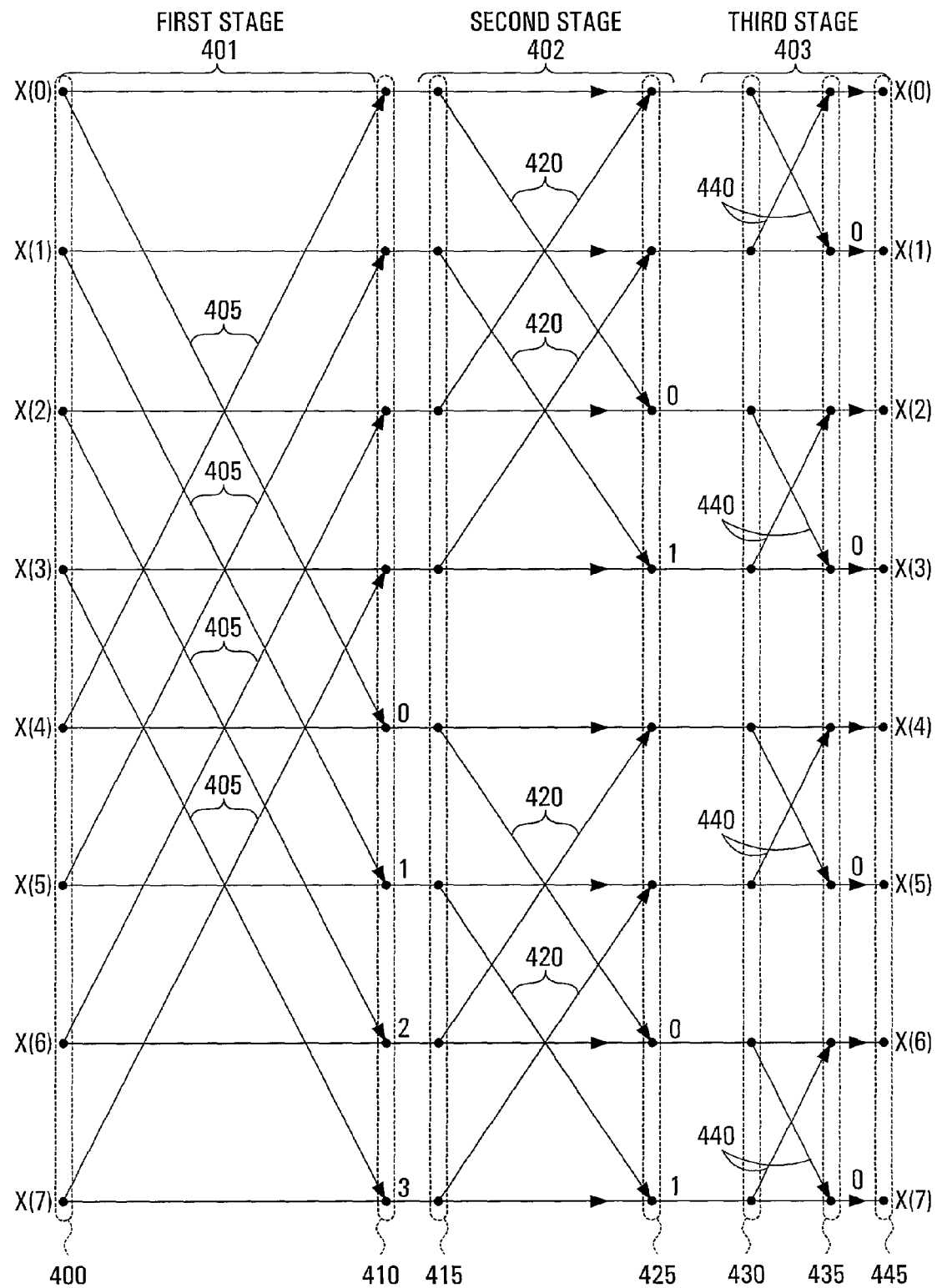
FIG. 1A is a diagram of a conventional 3-stage FFT (fast Fourier transform) computation using decimation in frequency (DIF)
Figure 1B:
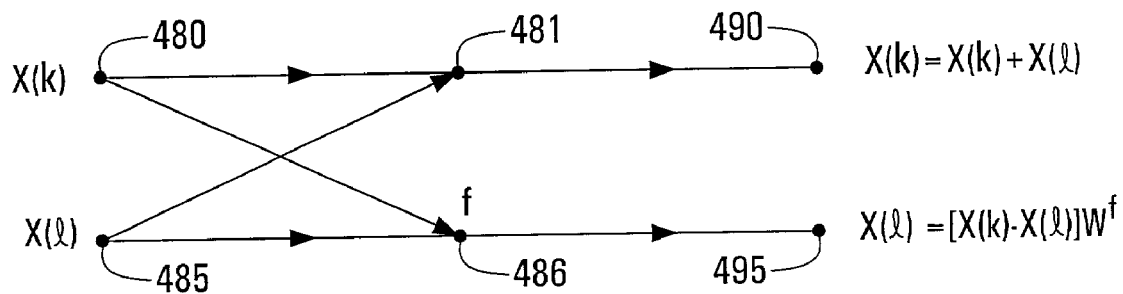
FIG. 1B is diagram of a butterfly computation performed upon two data points X(k) and X(l) of FIG. 1A.
Figure 1C:
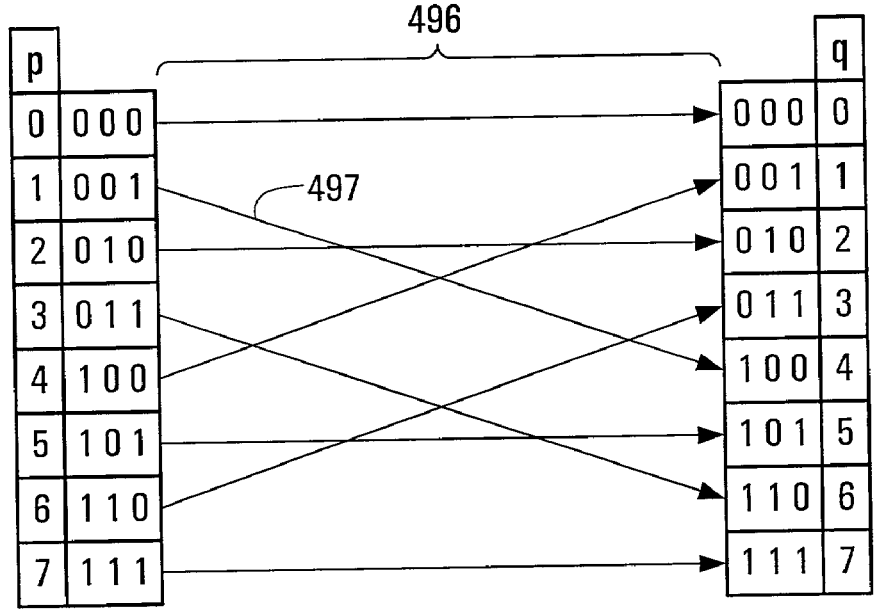
FIG. 1C is a diagram of bit reversal operations for data points of FIG. 1A.

Referring to FIG. 1A, shown is a diagram of a conventional 3-stage FFT (fast Fourier transform) computation using decimation in frequency (DIF). In general, a FFT computation includes several computation over one or more stages. In the 3-stage FFT computation of FIG. 1A, a number of computations are performed at each one of three stages to produce the 3-stage FFT computation. The 3-stage FFT computation is performed on eight data points $X(i)$ ($i=0$ to 7) at 400. Within a first stage 401, butterfly computations are performed at 410 for four butterflies 405 and new values for the data points $X(i)$ result at 415. In a butterfly computation, a computation is performed for each one of two points. As shown in FIG. 1B, a butterfly computation is performed on two data points $X(k)$ and $X(l)$ (in the first stage $0 \leq k \leq 3$ and $4 \leq l \leq 7$) at 480 and 485, respectively. Two computations are performed at 481 and 486 and new values of $X(k)$ and $X(l)$ result at 490 and 495, respectively. The new values $X(k)$ and $X(l)$ are given by $X(k)=X(k)+X(l)$ and $X(l)=(X(k)-X(l))W^f$, respectively, where $W^f$ is a twiddle factor with $W^f=e^{-2jf}$, wherein $j=\sqrt{-1}$ and f is a phase factor. In a second stage 402, new values for the data points $X(i)$ at 415 are computed at 425 for butterflies 420 resulting in new values of the data points $X(i)$ being input into a third stage 403 at 430 (in the second stage $k=0,1,4,5$ and $l=2,3,6,7$). In the third stage 403 new values for the data points $X(i)$ at 430 are computed at 435 for butterflies 440 resulting in new values of the data points $X(i)$ being output at 445 (in the third stage $k=0,2,4,6$ and $l=1,3,5,7$). At 445 the data points $X(i)$ are re-ordered by applying a bit reversal algorithm on the index i. More particularly, after having undergone butterfly computations through the first stage 401, the second stage 402 and the third stage 403, a data point $X(p)$ ($0 \leq p \leq 7$) of the data points $X(i)$ requires to be mapped, using a bit reversal operation, onto a data point $X(q)$ ($0 \leq q \leq 7$) of the data points $X(i)$ wherein q corresponds to the bit reversal of p. Bit reversal operations 496 for p=0 to 7 are shown in FIG. 1C. For example, a value of p=1 is expressed as three bits 001 in base-2 notation and a bit reversal operation 497 maps the three bits 001 onto 100 in base-2 which corresponds to q=4 in decimal notation and, consequently, $X(1)$ is mapped onto $X(4)$.

Figure 1D:
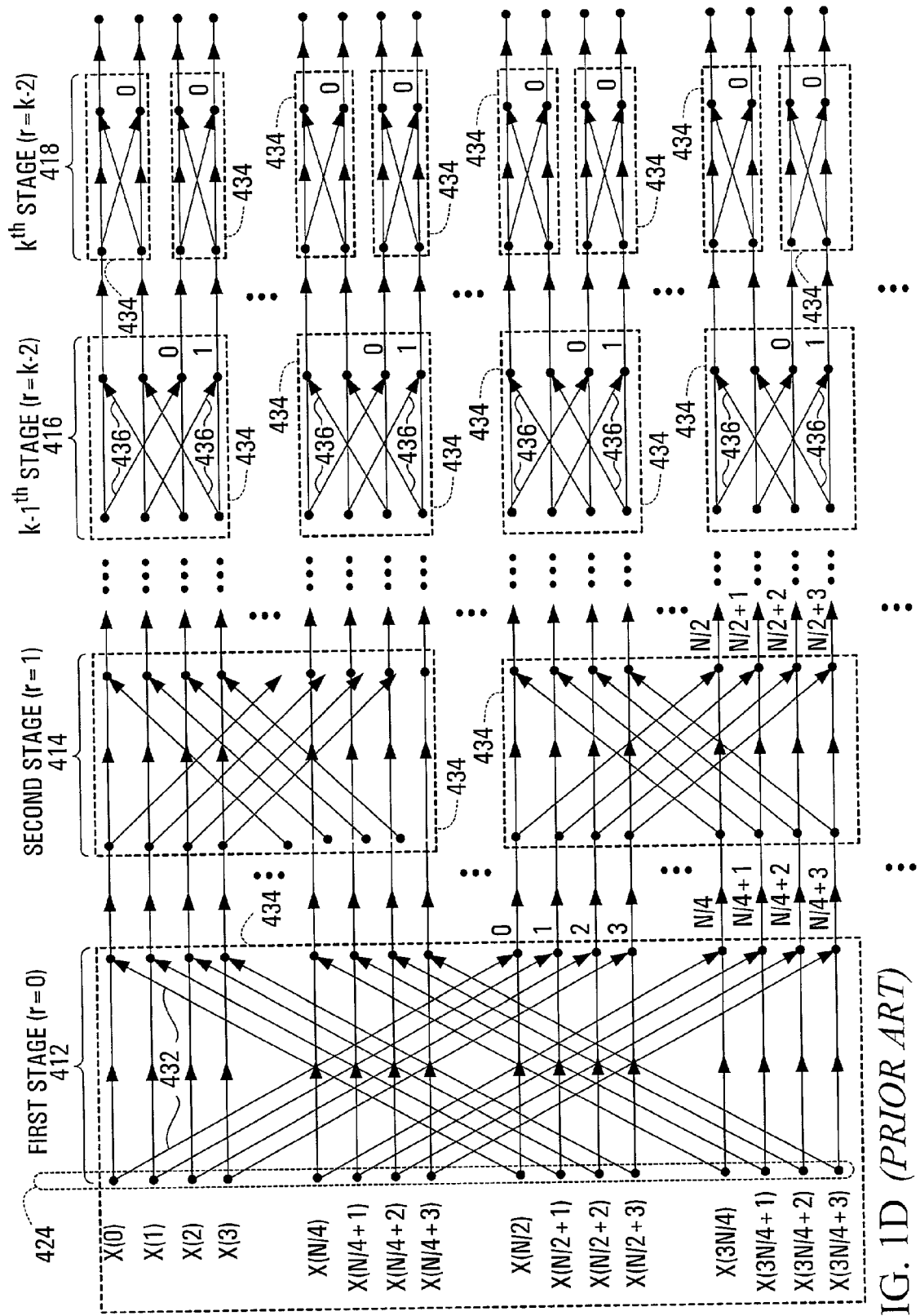
FIG. 1D is a diagram of a k-stage FFT computation of N data points using DIF.

Referring to FIG. 1D, shown is a diagram of a k-stage FFT computation of N data points using DIF. More particularly, shown are a first stage 412, a second stage 414, a $k-1^{th}$ stage 416 and a $k^{th}$ stage 418 of the k-stage FFT computation of N data points $X(n)$ ($0 \leq n \leq N-1$). Other stages are not shown for clarity. Furthermore, for clarity, only 16 of the N data points $X(n)$ are shown at 424. The number of stages, k, is given by $k=\log_2(N)$. Within each one of the k-stages, are N/2 butterflies. Only one butterfly 432 is identified for clarity. More particularly, within a stage, r ($0 \leq r \leq k-1$), the N/2 butterflies are grouped into $2^r$ blocks of data 434. For example, in the first stage 412 where r=0 there are $2^0=1$ blocks of data 434 and in the second stage 414 where r=1 there are $2^1=2$ blocks of data 434. Furthermore, within any one of the blocks of data 434 of a stage, r, there are $N/2^{r+1}$ butterflies. For example in the $k-1^{th}$ stage 416 where r=k-2 respective ones of the blocks of data 434 have $N/2^r=2^k/2^{k-2+1}=2$ butterflies 436. Computations for all butterflies within the blocks of data 434 must be done and a conventional method used to iterate through the butterflies of the k-stage FFT computation will now be described with reference to FIG. 1E.

Figure 1E:
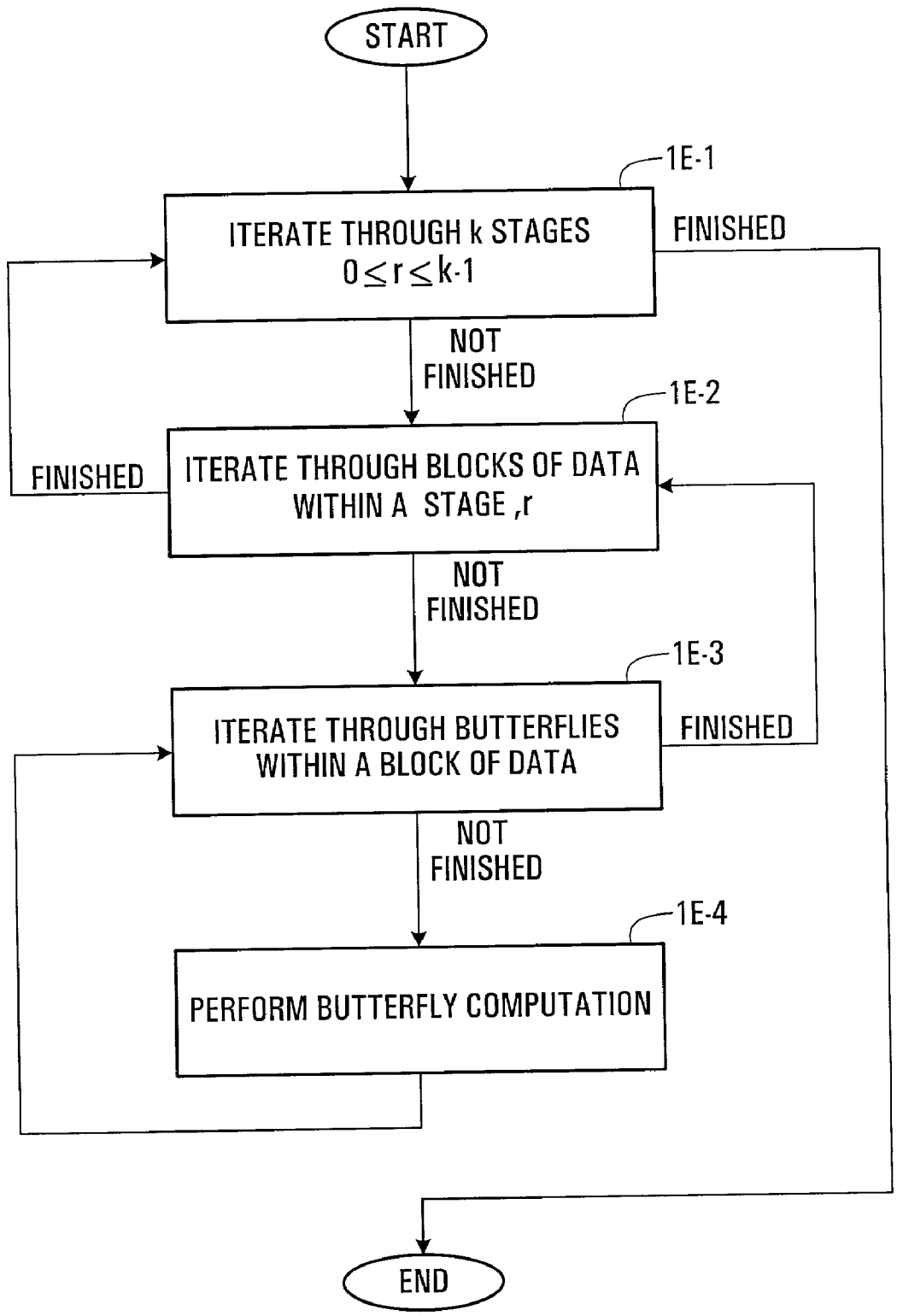
FIG. 1E is a flow chart of a method used to perform the k-stage FFT computation of N data points of FIG. 1D.

Referring to FIG. 1E, shown is a flow chart of a method used to perform the k-stage FFT computation of N data points of FIG. 1D. Beginning with a stage, r with r=0, iterations are performed for k stages, r, with $0 \leq r \leq k-1$ (step 1E-1). Iterations are performed for each one of the blocks of data 434 within the stage, r (step 1E-2). Within a respective block of data 434 of the stage, r, iterations are performed for all butterflies within the respective block of data 434 (step 1E-3). For a butterfly within the respective block of data 434 of the stage, r, a butterfly computation is performed (step 1E-4). As discussed above, within a stage, r, there are $2^r$ blocks of data 434 and within each one of the blocks 343 there are $N/2^{r+1}$ butterflies for a total of $(2^r)(N/2^{r+1})=N/2$ butterflies per stage. Therefore the k-stage FFT computation requires $k(N/2)=(N/2)\log_2(N)$ butterfly computations.

Figure 2A:
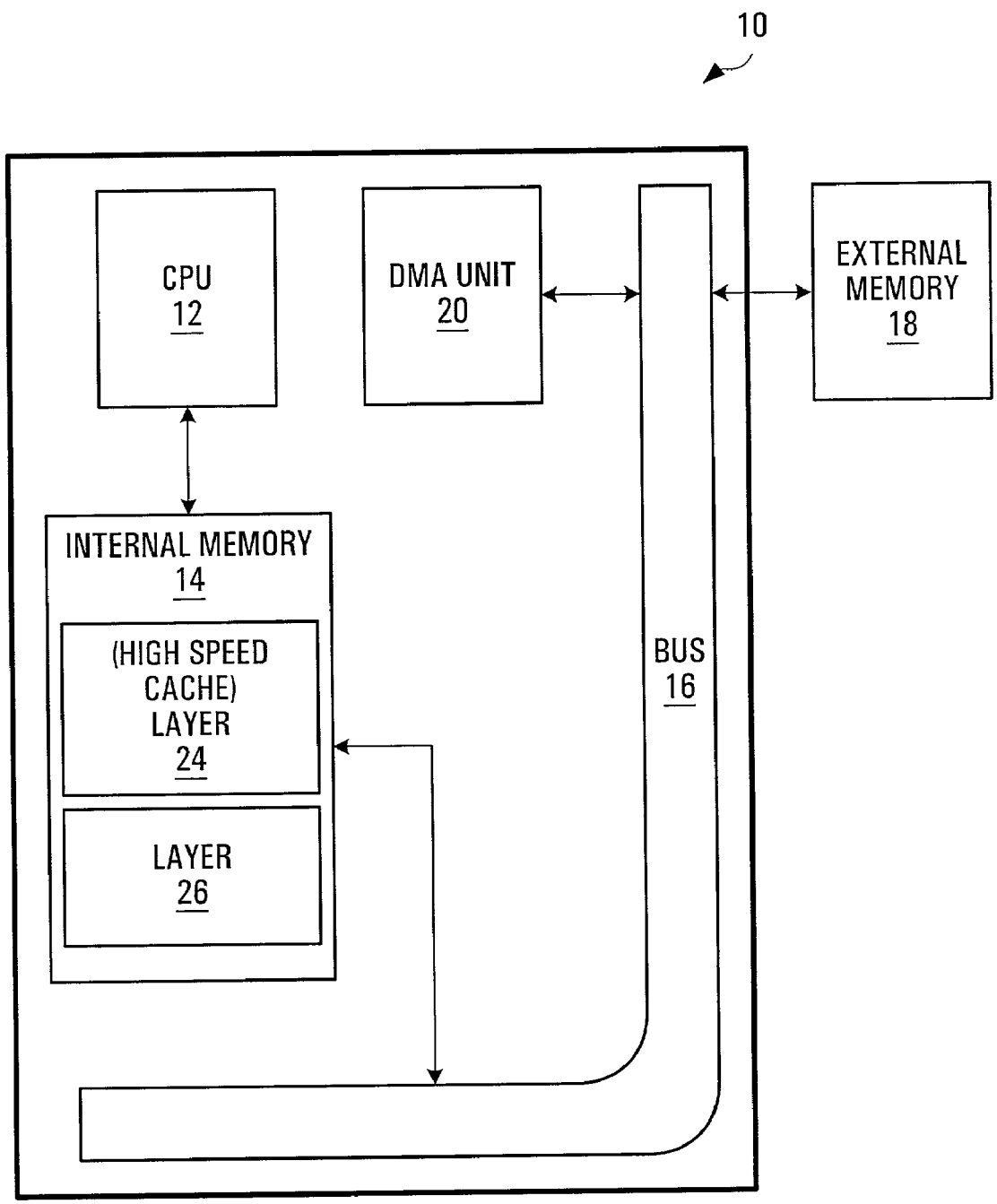
FIG. 2A is a block diagram of a processing platform used to perform the k-stage FFT computation of FIGS. 1D and 1E.
Figure 2B:
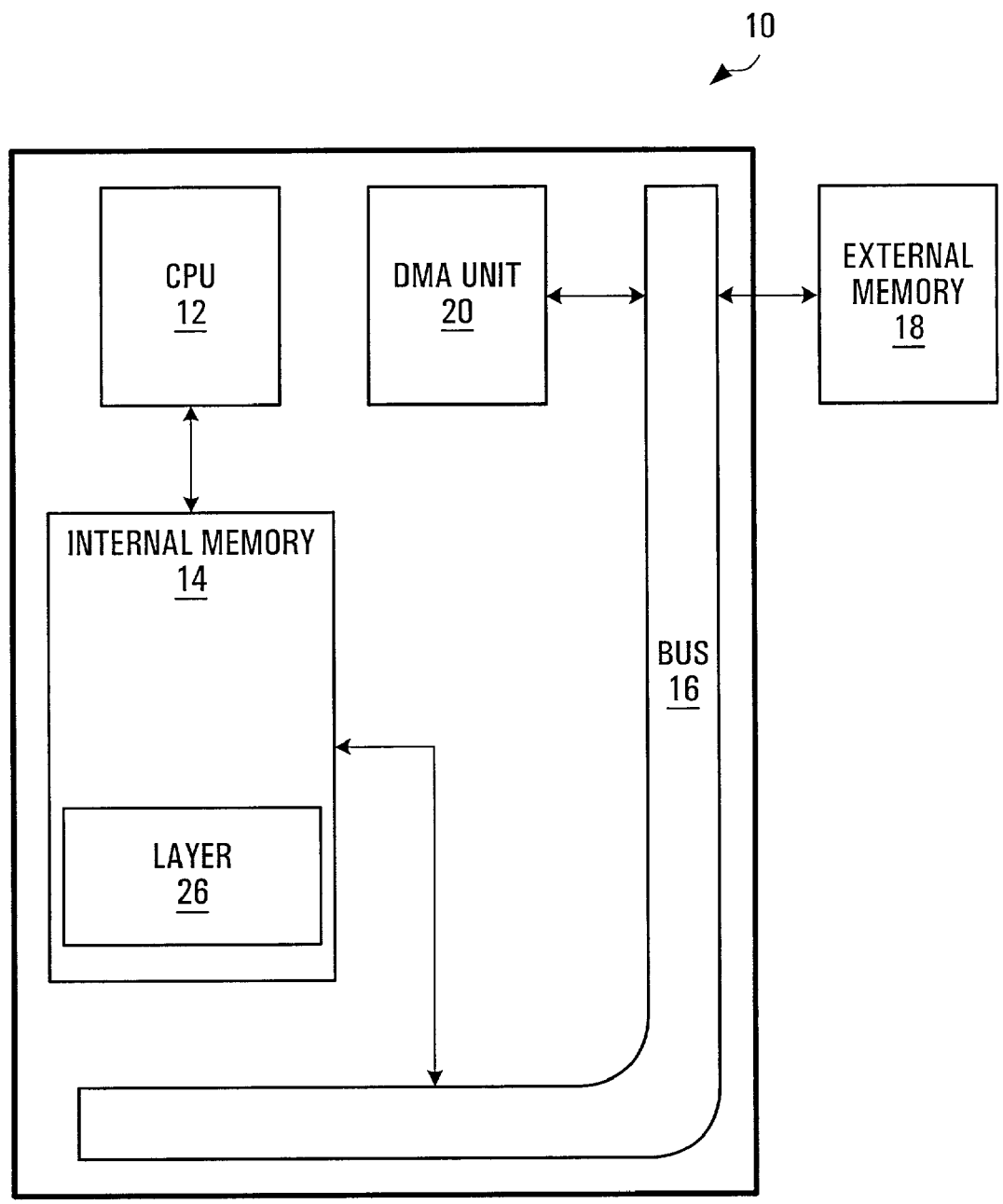
FIG. 2B is another block diagram of a processing platform used to perform the k-stage FFT computation of FIGS. 1D and 1E.

Referring to FIG. 2A, shown is a block diagram of a processing platform, used to perform the k-stage FFT computation of FIGS. 1D and 1E. The processing platform, generally indicated by 10, includes a CPU (central processor unit) 12, an internal memory 14, a bus 16, an external memory 18, and a Direct Memory Access (DMA) unit 20. The internal memory 14 includes layers 24 and 26 wherein layer 24 corresponds to a high speed cache. As shown in FIG. 2B, in some cases the internal memory 14 includes only layer 26 and no high speed cache (the layer 24 is not present). In other cases, the internal memory may have one or more layers. The internal memory 14 is directly accessible by the CPU 12. When the CPU 12 needs to operate on data stored in layer 24 of the internal memory 14, the CPU 12 retrieves the data directly from layer 24. However, when the CPU 12 needs to operate on data stored in layer 26 the data is first moved into layer 24 before being retrieved by the CPU 12. To free up memory in layer 24 in the event that layer 24 does not have enough memory to store both the data being retrieved and existing data residing in layer 24, the existing data may be transferred to layer 26 before the data is moved to layer 24. As such, the CPU 12 retrieves data stored in layer 24 faster than data stored in layer 26. When the CPU 12 is finished processing the data, the CPU 12 overwrites the data stored in layer 24 with output data.

Data may also be stored in the external memory 18 but the external memory 18 is not directly accessible by the CPU 12. When the CPU 12 needs to operate on data stored in the external memory 18, the CPU 12 issues a command to the DMA unit 20 to retrieve the data. The DMA unit 20 accesses the data in the external memory 18, and imports it across the bus 16 into the internal memory 14, where the processor 12 can process the data. In the event that the internal memory 14 does not have enough memory to store both the data being retrieved and existing data residing in internal memory 14, memory must be freed up. To do so the DMA unit 20 accesses the existing data in the internal memory 14, and exports it across the bus 16 into the external memory 18 before any data is moved into the internal memory 14. As part of processing the data, the processor 12 may generate output data. When the CPU 12 is finished processing the data, the CPU 12 passes the output data back into the internal memory 14. There are several additional steps in accessing data from the external memory 18 when compared to the number of steps required to access data from the internal memory 14 and therefore accessing data residing in the external memory 18 is much slower than accessing data residing in internal memory 14.

Typically, the internal memory 14 may have 64K bytes of memory available for data storage whereas the external memory 18 may have, for example, 2.5M bytes of memory available for storage. The memory available for storing data in the internal memory 14 is much smaller than the memory available in the external memory 18. Therefore in performing a FFT computation of N data points the memory available in the external memory 18 may be large enough to store the N data points. However, the memory available in the internal memory 14 may be large enough to store only a small fraction of the N data points.

In an illustrative example, a FFT computation is performed for N=256K=256×1024 data points. A data point in FFT computations is complex having a real and imaginary part each requiring 4 Bytes of memory for storage. Thus each one of the data points requires 2×4 Bytes=8 Bytes of memory for storage. Assuming that the external memory 18 has 2.5M Bytes of memory available it can store 2.5M Bytes/8 Bytes=312.5K data points which is more than the number N=256K of data points in the example. However, assuming that the internal memory 14 has 64K Bytes of memory available it can store 64K Bytes/8 Bytes=8K data points which is a small fraction of the number, N=256K of data points. Consequently, in performing a FFT computation the CPU 12 can only instruct the DMA unit 20 to import at most 8K data points into the internal memory 14 at one time. Therefore, data in the external memory 18 need to be imported into the internal memory 14 and data in the internal memory 14 must be exported to the external memory 18, through the bus 16, several times during the FFT computation. As discussed above with reference to FIGS. 1D and 1E, there are $(N/2)\log_2(N)=k(N/2)$ butterfly computations required and therefore there can be up to $k(N/2)$ imports/exports of data between the external memory 18 and the internal memory 14. Furthermore, data in the internal memory 14 also need to be swapped, between layers 24 and 26, several times during the calculation. Despite the speed of the CPU 12 in performing calculations, memory access times will constrain the speed of the FFT computation due to the large number of data exchanges between the internal memory 14 and the external memory 18, and between layers 24 and 26 of the internal memory 18.

In one embodiment of the invention, the speed at which a FFT computation is performed is increased by reducing the number of times the DMA unit 20 must transfer data between the internal memory 14 and the external memory 18 and by reducing the number of times the CPU 12 must instruct the internal memory 14 to swap data between the layers 24, 26. This is achieved by providing an algorithm in which data are imported from the external memory 18 to the internal memory 14 and having the CPU 12 perform several calculations on all the imported data before they are exported back to the external memory 18. Furthermore, the algorithm is structured so that it provides locality within the internal memory 14. More particularly, the algorithm provides a method which enables the DMA unit 20 to store the data being imported into the internal memory 14 with a structure that results in a reduction in the number of times the imported data is swapped between layers 24, 26 of the internal memory 14 during the FFT computation. This is achieved while keeping the complexity of the algorithm relatively low and therefore providing a method in which the regularity of computer code used to implement the algorithm is not significantly compromised. Furthermore, in some embodiments, the speed of the FFT computation of N data points is increased by having the DMA unit 20 import/export data between the internal memory 14 and the external memory 18 while at the same time having the CPU 12 perform calculations on other data in the internal memory 14. As a result, overhead due to data transfer times associated with import/export of data between the internal memory 14 and the external memory 18 is reduced resulting in real-time evaluation of the FFT computation.

Figure 3A:
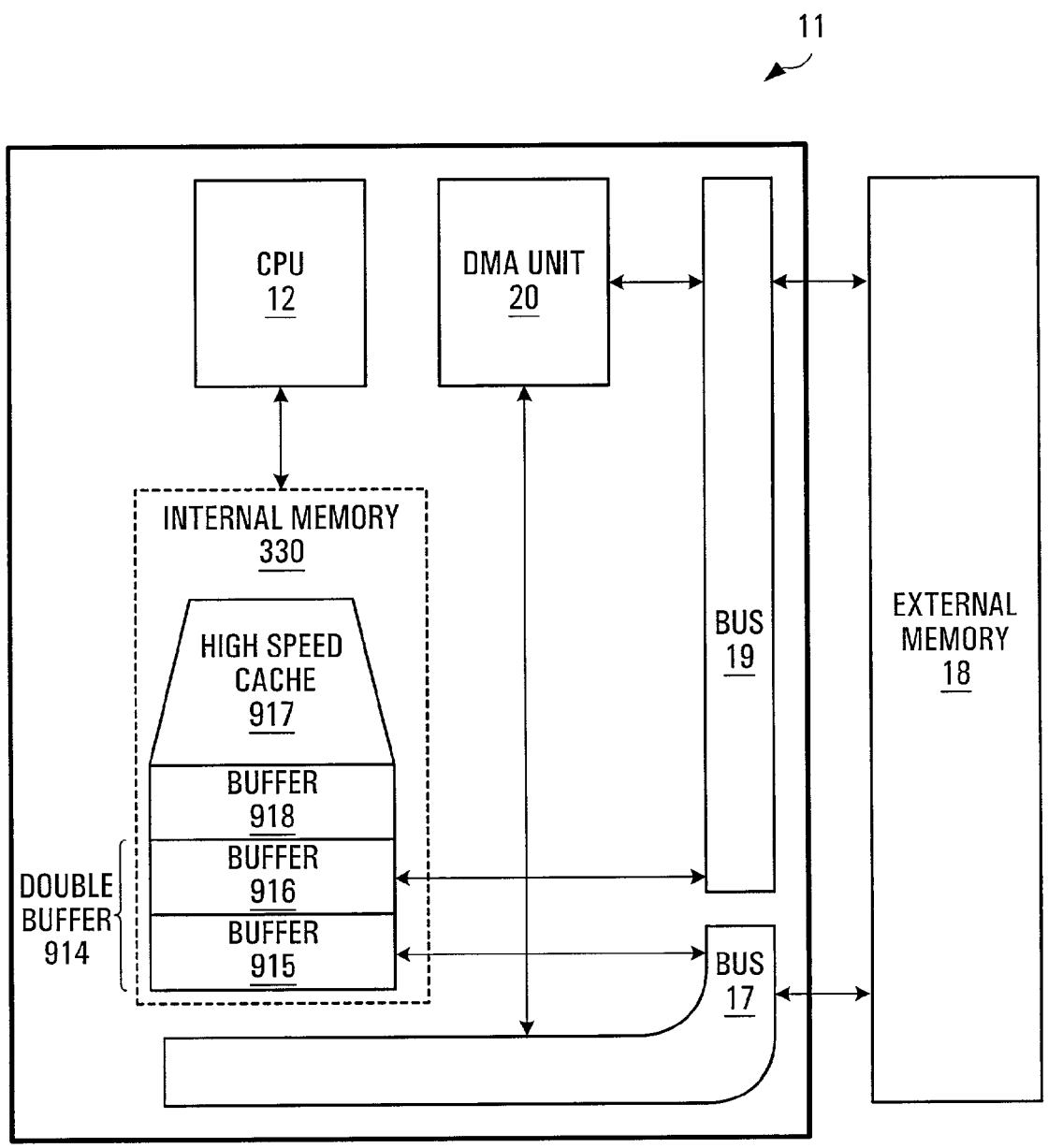
FIG. 3A is a block diagram of a processing platform used to perform a FFT computation, provided by an embodiment of the invention.
Figure 3B:
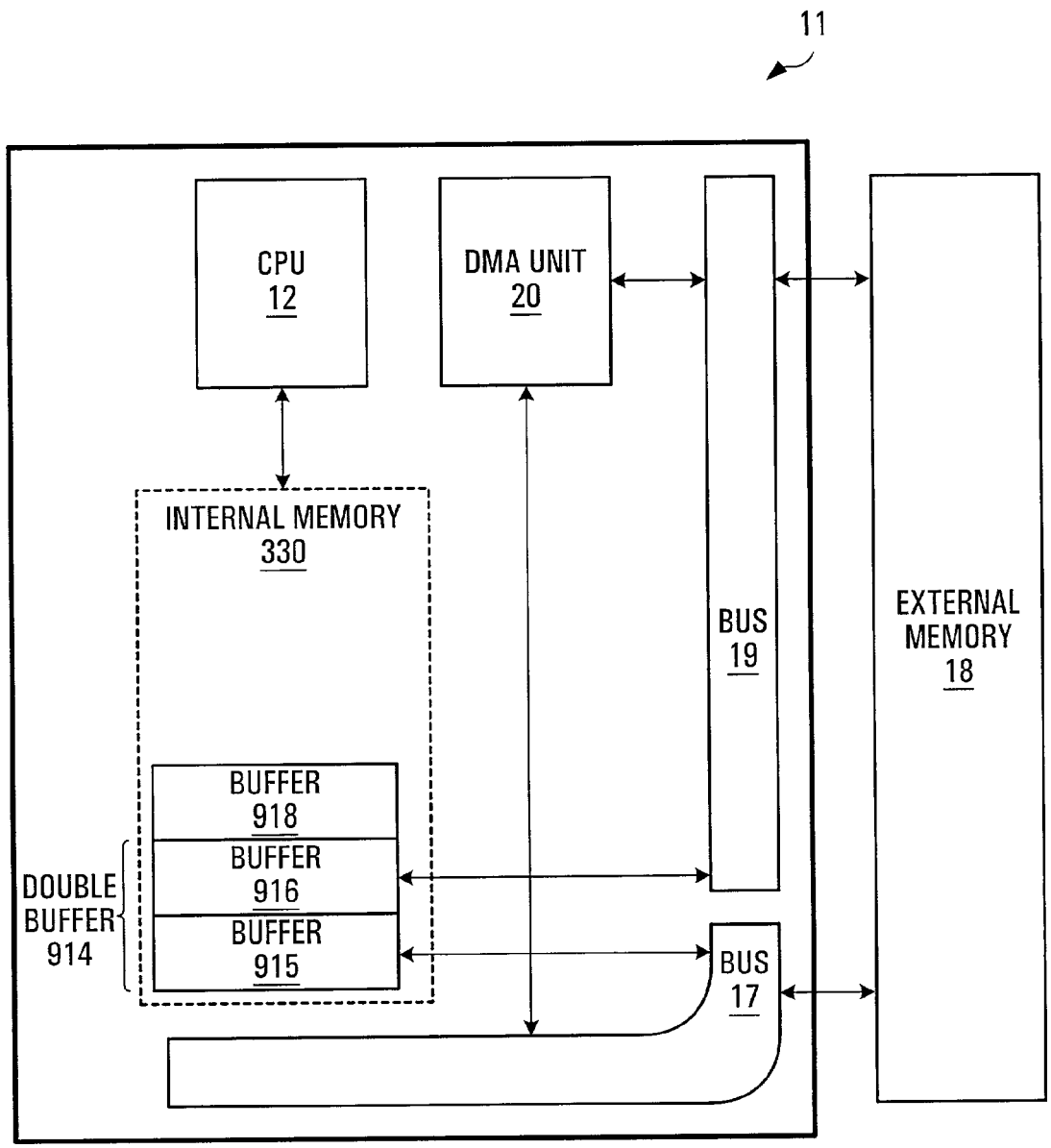
FIG. 3B is a block diagram of a processing platform used to perform a FFT computation, provided by another embodiment of the invention.

Referring to FIG. 3A, shown is a block diagram of a processing platform used to perform a FFT computation, provided by an embodiment of the invention. The processing platform is generally indicated by 11 and is similar to the processing platform 10 of FIG. 2A except that the internal memory 14 of the processing platform 10 has been replaced with an internal memory 330 in the processing platform 11. The internal memory 330 has a high-speed cache 917, a buffer 918 and a double buffer 914. Two buffers 915 and 916 make up the double buffer 914. Furthermore, the processing platform 11 has two buses 17, 19, through which the DMA unit 20 each one of the two buffers 915 and 916 has a respective bus 16, 17 which is used to import and export data between the external memory 18 and a respective one of the two buffers 915 and 916. In some embodiments of the invention, the internal memory 330 does not have a high-speed cache 917. This is shown in FIG. 3B where the internal memory 330 does not have a high speed cache 917. In one embodiment of the invention, the buffer 918 has 32 Kbytes of memory available in which twiddle factors used to perform FFT computations are stored throughout the k-stage FFT computation. Furthermore, the double buffer 914 is used to store set of data point of the N data points which will be imported from the external memory 18.

Figure 3C:
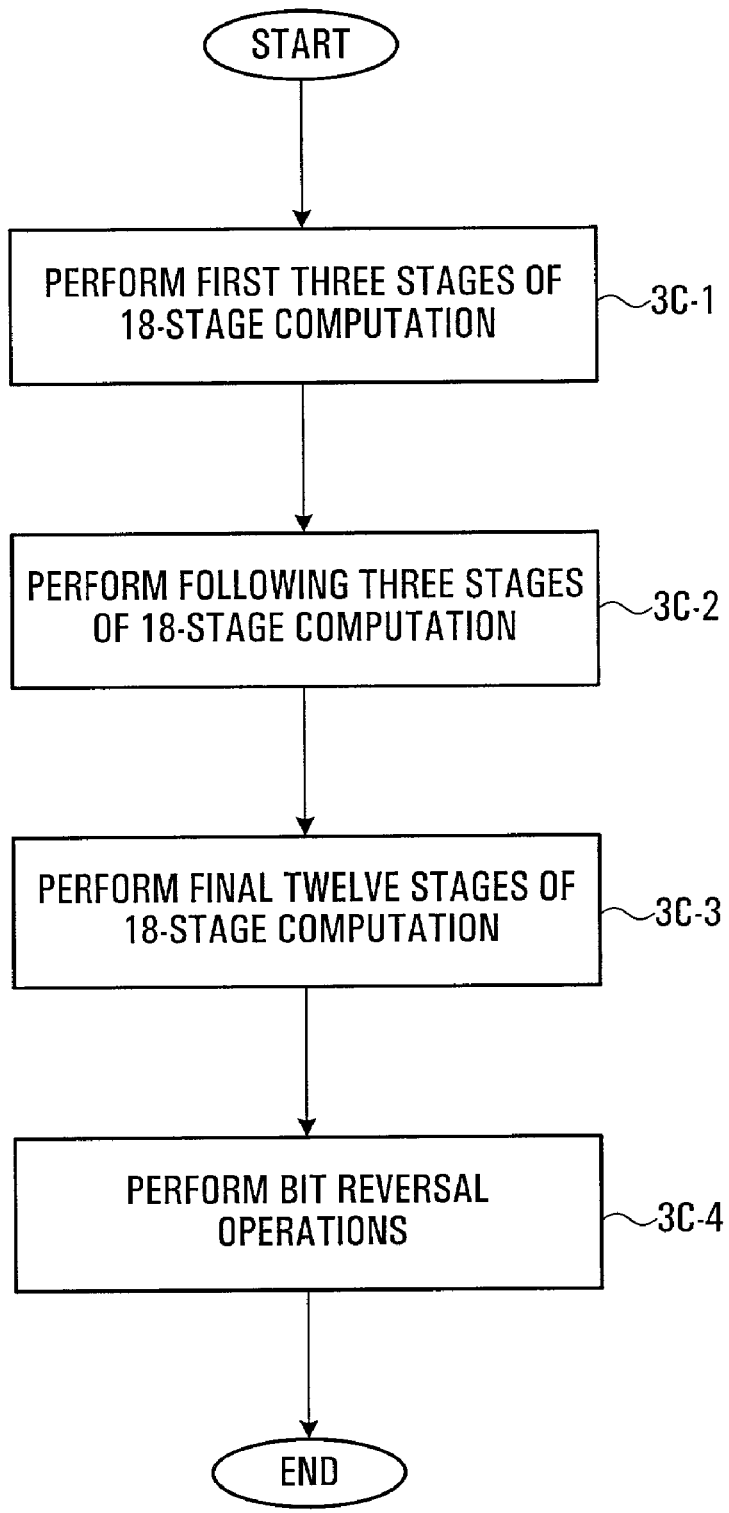
FIG. 3C is a flow chart of a method used by the processing platforms of FIGS. 3A and 3B to perform the FFT computations.

Referring to FIG. 3C, is a flow chart of a method used by the processing platforms of FIGS. 3A and 3B to perform the FFT computations. The method will be illustrated by way of example to conduct a FFT computation of a sample of N=256K data points. A FFT computation of N data points corresponds to a k=$\log_2$(N) stage FFT computation. Therefore, the FFT computation of N=256K data points requires an 18-stage FFT computation wherein k=$\log_2$(256K)=$\log_2$(256×1024)=18. The 18-stage FFT computation is performed in a sequence of four steps (steps 3C-1, 3C-2, 3C-3 and 3C-4). At step 3C-1, the first three stages of the 18-stage FFT computation are performed in a set of 3-stage FFT computations. Details of the set of 3-stage FFT computations of step 3C-1 are given below with reference to FIGS. 4A to 4D, 5A, 5B and 6A. At step 3C-2, three stages following the first three stages of the 18-stage FFT computation are performed in another set of 3-stage FFT computations. Details of the 3-stage FFT computations of step 3C-2 are given below with respect to FIGS. 4A to 4D, 5A, 5B and 6B. At step 3C-3, 12 final stages of the 18-stage FFT computation are performed in a set of 12-stage FFT computations. Details of the set of 12-stage FFT computations of step 3C-3 are given below with respect to FIGS. 7A and 7B. After the set of 12-stage FFT computations of step 3C-3 has been done, bit reversal operations are performed on the N=256K data points (step 3C-4) as described with reference to FIG. 1C except that in this case the bit reversal operations are performed upon the N=256K data points each carrying 18 bits as opposed to 3 bits.

Figure 4A:
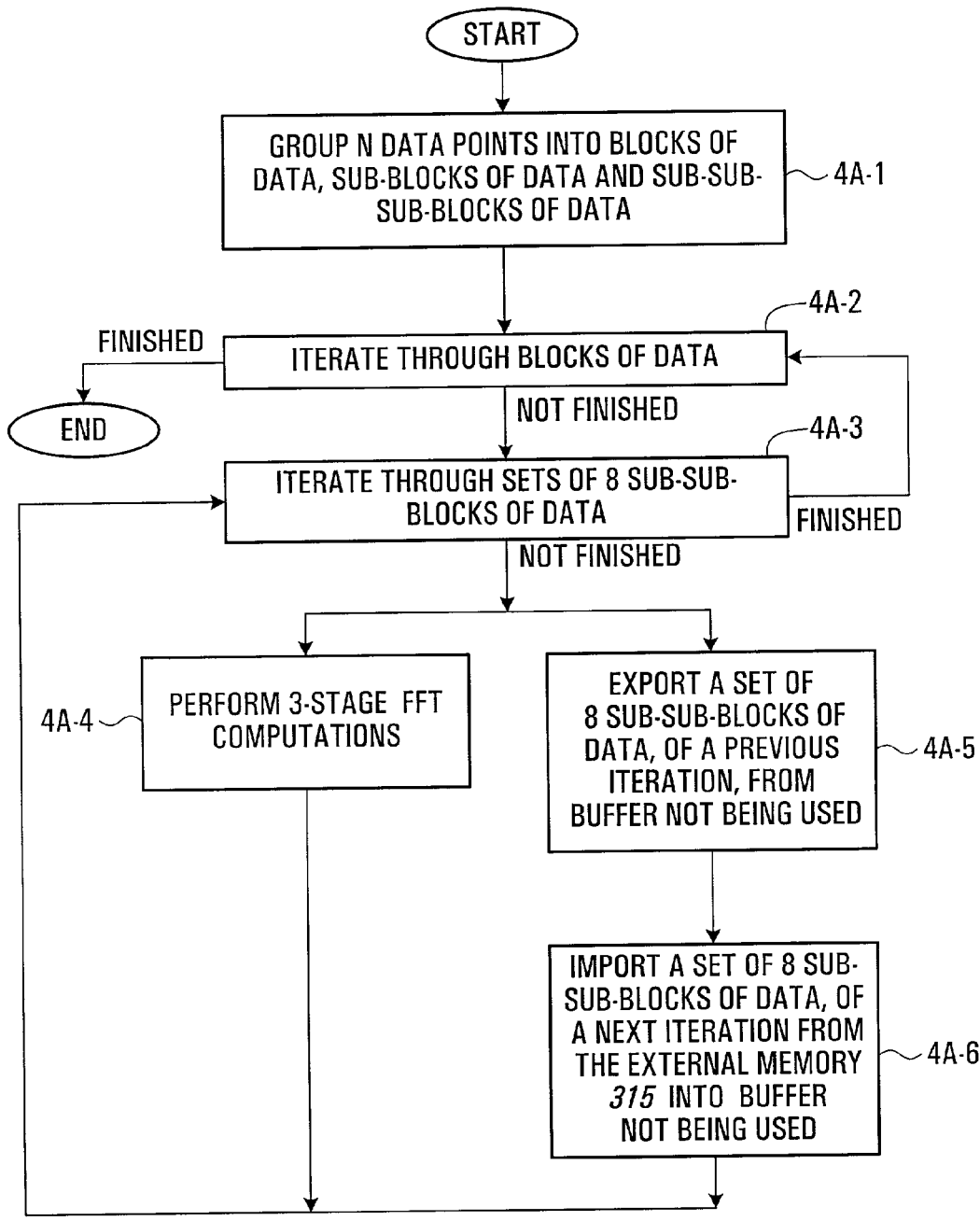
FIG. 4A is a flow chart of a method used to perform sets of 3-stage FFT computations used in the FFT computations of FIG. 3C.
Figure 6A:
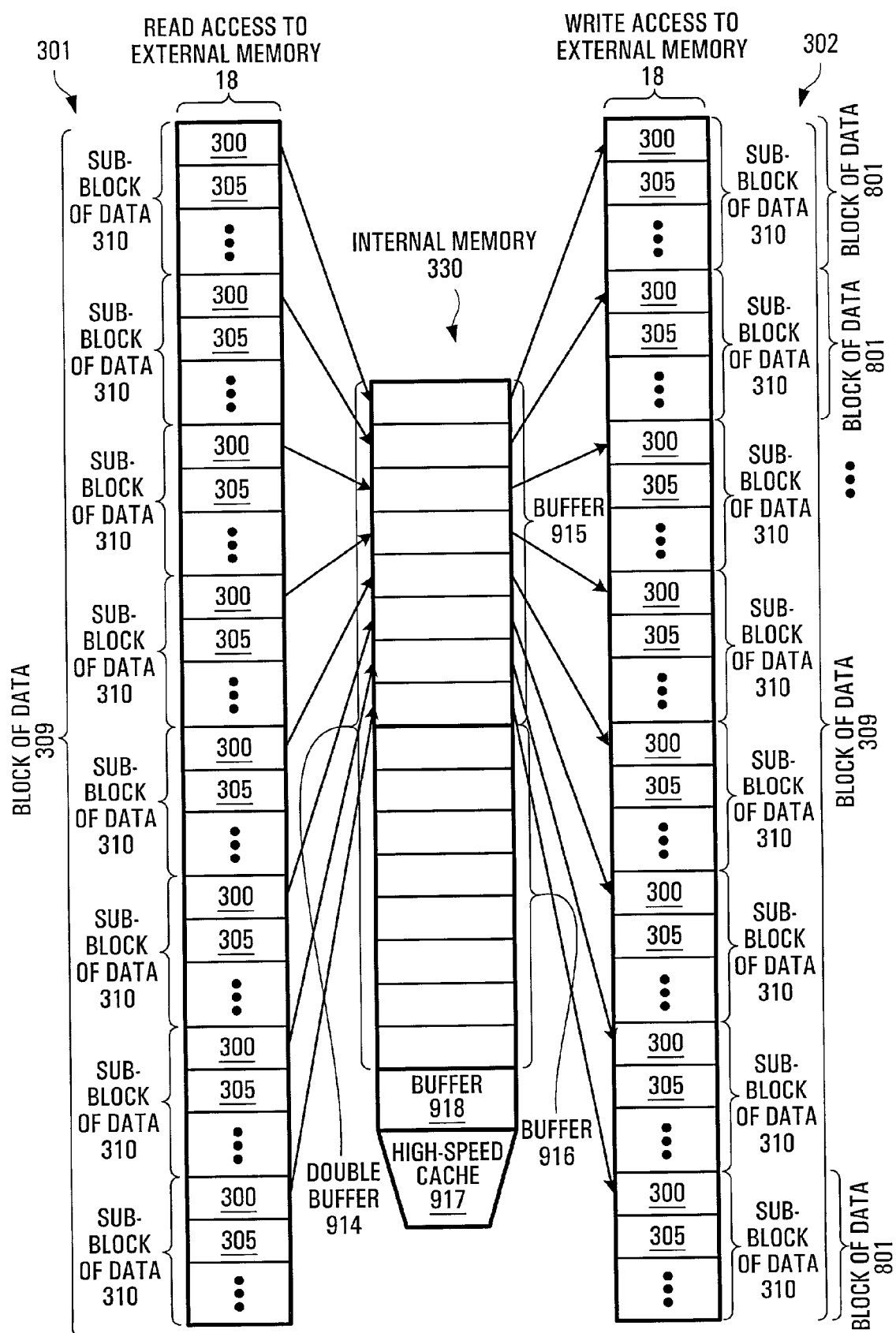
FIG. 6A is a diagram of sub-sub-blocks of data being of imported into an internal memory form an external memory and being exported from the internal memory back to the external memory, for one of two sets of 3-stage FFT computations of FIG. 3C.

Referring to FIG. 4A, shown is a flow chart of a method used to perform the sets of 3-stage FFT computations used in the FFT computations of FIG. 3C (steps 3C-1 and 3C-2). The method according to FIG. 4A is now described for the set of 3-stage FFT computations of step 3C-1. The N data points (N=256K) are grouped logically into blocks of data, sub-blocks of data and sub-sub-blocks of data (step 4A-1). Step 4A-1 is only used to show how the N data points will be imported and exported into and from the internal memory 330 and no operations are performed on anyone of the N data points at step 4A-1. The way by which the data points will be imported and exported into and from the internal memory 330, respectively, is shown in FIG. 6A. In FIG. 6A, on the left-hand side generally indicated by 301 a read access to the external memory 18 is shown, and on the right-hand side generally indicated by 302 a write access to the external memory 18 is also shown. Also shown in FIG. 6A is the internal memory 330 with the high-speed cache 917, the two buffers 915, 916 and the buffer 918. The external memory 18 carries the N data points with the N data points grouped into $2^{IS}=2^{(0)(3)}=1$ block of data 309 of $N/2^{IS}=N$ data points wherein for step 3C-1, I=0 and for a 3-stage FFT computation S=3. The N data points within the block of data 309 are grouped into $2^S=2^3=8$ sub-blocks of data 310 and each sub-block of data 310 has $M_1$ sub-sub-blocks of data (only two sub-sub-blocks of data 300, 305 for each one of the sub-blocks of data 310 are shown for clarity). The sub-sub-blocks of data 300 form a set of $2^3=8$ sub-sub-blocks of data and the sub-sub-blocks of data 305 form another set of $2^3=8$ sub-sub-blocks of data. Combining all the sub-sub-blocks of data in this way results in $M_1$ sets of 8 sub-sub-blocks of data. Each one of the sub-blocks of data 310 contains $N/2^S=256K/8=64K$ data points and each one of the sub-sub-blocks of data contains $M_2$ data points. $M_1$ is given by $M_1=N/(2^{IS+S}M_2)=N/(8M_2)$. $M_2$ is selected as a function of the memory available in the buffers 915, 916. This is shown in FIG. 6A wherein a set of 8 sub-sub-blocks of data comprising the sub-sub-blocks of data 300 will be imported from the read access to the external memory 18 on the left-hand side 301 into the buffer 915 and then exported to the write access to the external memory 18 on the right-hand side 302 after being operated on. In the example, the double buffer 914 has 64K bytes of memory available for data points, or equivalently, it can hold $M_f$=64K bytes/8 bytes=8K data points. The memory available is logically divided between the buffers 915 and 916 each capable of storing $M_f/2$=8K/2=4K data points. As shown in FIG. 6A there are 8 of the sub-sub-blocks 300 being imported into the buffer 915 at one time and each one of the sub-sub-blocks contains $M_2$=4K/8=0.5K data points and $M_1=N/(2^{IS+S}M_2)=256K/(8\times0.5K)=64$.

In the method of FIG. 4A, iterations are performed for all blocks of data (step 4A-2) by performing step 4A-3 for each block of data 309. In this case, there is only one block of data 309 and step 4A-3 is executed only once. Iterations are also performed for the $M_1$ sets of 8 sub-sub-blocks of data (step 4A-3) by performing steps 4A-4, 4A-5 and 4A-6 for each one of the $M_1$ sets of 8 sub-sub-blocks of data. At step 4A-4, $M_2$=0.5K 3-stage FFT computations are performed on data points, which have been imported into one of the buffers 915, 916, within a set of 8 sub-sub-blocks of data, M, ($0\leq M\leq M_1$), of the $M_1$ sets of 8 sub-sub-blocks of data. The $M_2$=0.5K 3-stage FFT computations of step 4A-4 are described below with reference to FIGS. 4B to 4D, 5A and 5B. While the 3-stage FFT computations of step 4A-4 are being performed, at step 4A-5, a set of 8 sub-sub-blocks of data, M−1, from a previous iteration of step 4A-3 are exported from one of the buffers 915, 916 that is not being used in the 3-stage FFT computations of step 4A-4. Furthermore, at step 4A-6 a set of 8 sub-sub-blocks of data, M+1, of a next iteration of step 4A-3 are imported from the external memory 18 into one of the buffers 915, 916 that is not being used in the 3-stage FFT computations of step 4A-4. For example, in one iteration of step 4A-3, the 3-stage FFT computations of step 4A-4 are being performed on data points of the set of 8 sub-sub-blocks of data comprising the sub-sub-blocks of data 300 which have been imported into the buffer 915 in a previous iteration of step 4A-3. Furthermore, while the 3-stage FFT computations of step 4A-3 are being performed upon data points of the sub-sub-blocks of data 300, the set of 8 sub-sub-blocks of data comprising the sub-sub-blocks of data 305 are being imported into the buffer 916 at step 4A-6 for a next iteration of step 4A-3.

Performing exports and imports of steps 4A-5 and 4A-6, respectively, in parallel with the 3-stage FFT computations of step 4A-4 reduces overhead in data transfer times between the external memory 18 and the internal memory 330. The reduction in data transfer times depends on the ratio of the time required to perform the 3-stage FFT computations of step 4A-4 to data transfer times associated with steps 4A-5 and 4A-6. The overhead decreases with increasing ratio and in cases when the ratio is greater or equal to 1 the overhead is reduced to zero.

Figure 4B:
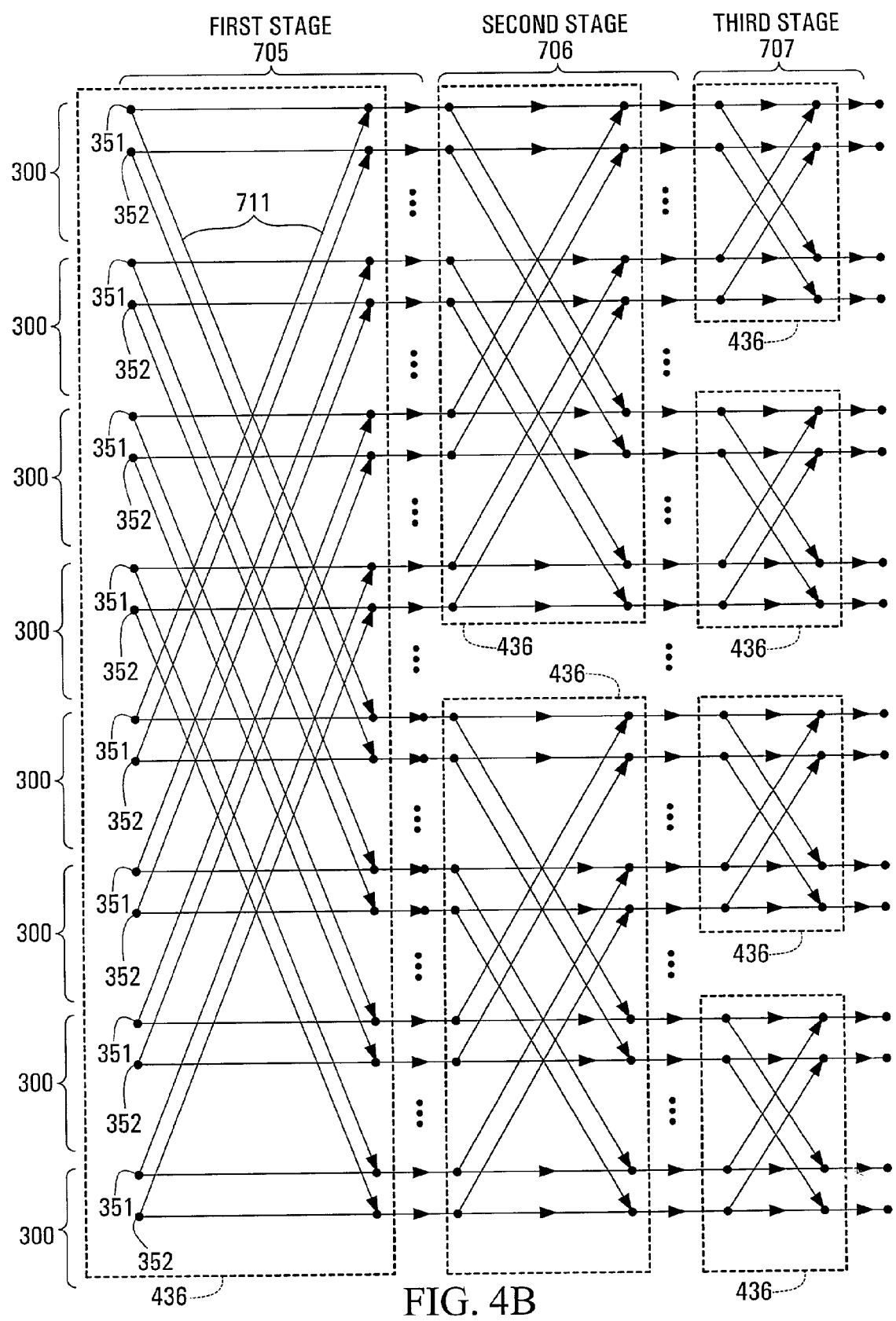
FIG. 4B is a diagram of the 3-stage FFT computations of FIG. 4A.

Referring to FIG. 4B, shown is a diagram of the 3-stage FFT computations of FIG. 4A (step 4A-4). More particularly, as an example, the 3-stage FFT computations of step 4A-4 are performed on data points from the set of 8 sub-sub-blocks of data comprising the sub-sub-blocks of data 300 (M= 0). A first 3-stage FFT computation is performed on data points 351 wherein each one of the data points 351 is a first data point from a respective one of the sub-sub-blocks of data 300. A second 3-stage FFT computation is performed on data points 352 wherein each one of the data points 352 is a second data point in a respective one of the sub-sub-blocks of data 300. Other 3-stage FFT computations are performed for other data points within the sub-sub-blocks of data 300, for a total of $M_2=0.5K$ 3-stage FFT computations, but they are not shown in the interest of clarity. In embodiments of the invention, the 3-stage FFT computations of step 4A-4 as described with reference to FIG. 4B can be performed using a number of methods. Two methods are described below with reference to FIG. 4C and FIG. 4D. The method according FIG. 4C will be described with respect to an embodiment of the invention in which the internal memory 330 has a high-speed cache 917 as shown in FIG. 3A whereas the method according FIG. 4D will be described with respect to an embodiment of the invention in which the internal memory 330 does not have a high-speed cache 917 as shown in FIG. 3B.

Figure 4C:
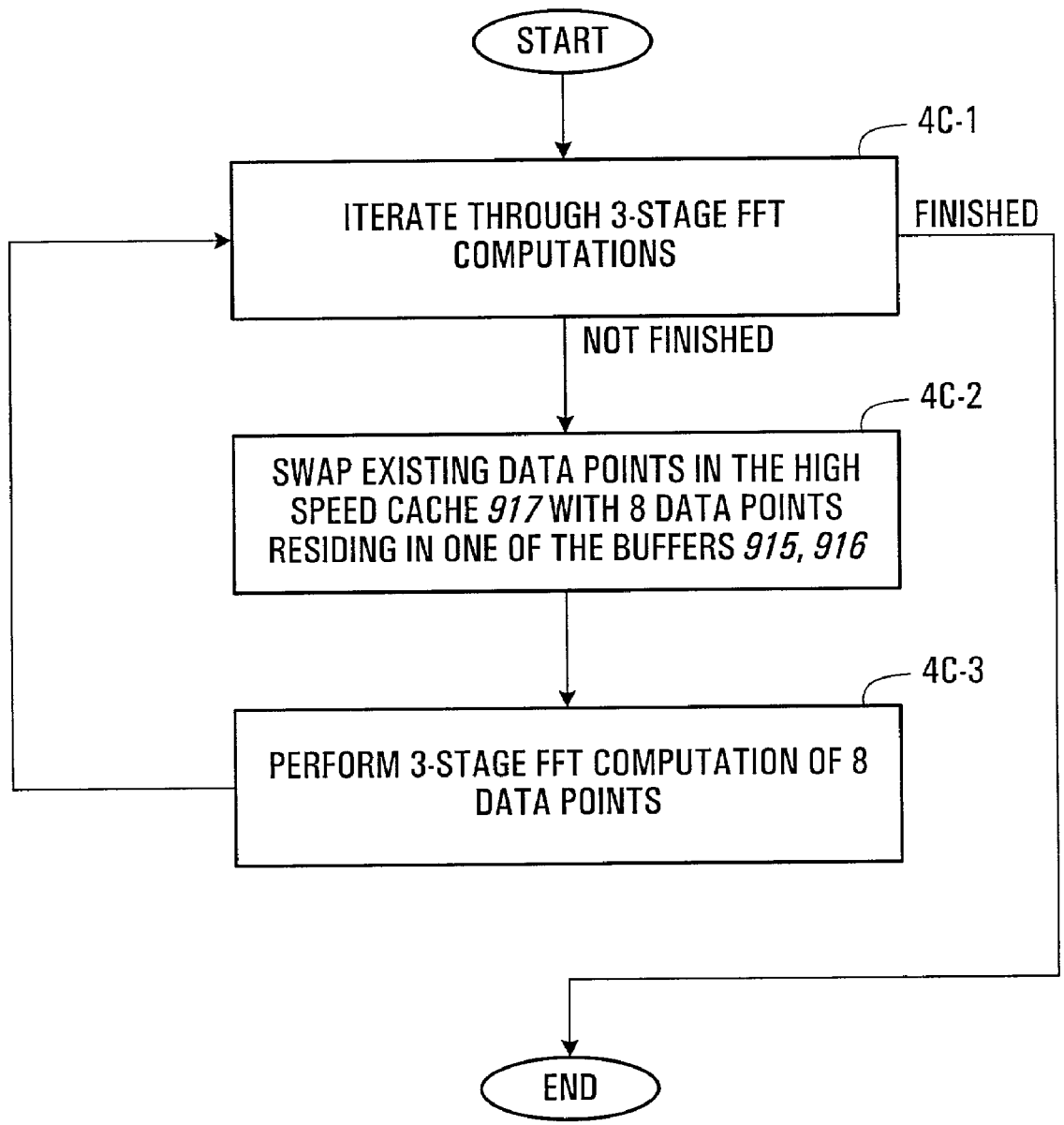
FIG. 4C is a flow chart of a method of performing the 3-stage FFT computations of FIG. 4B.
Figure 5A:
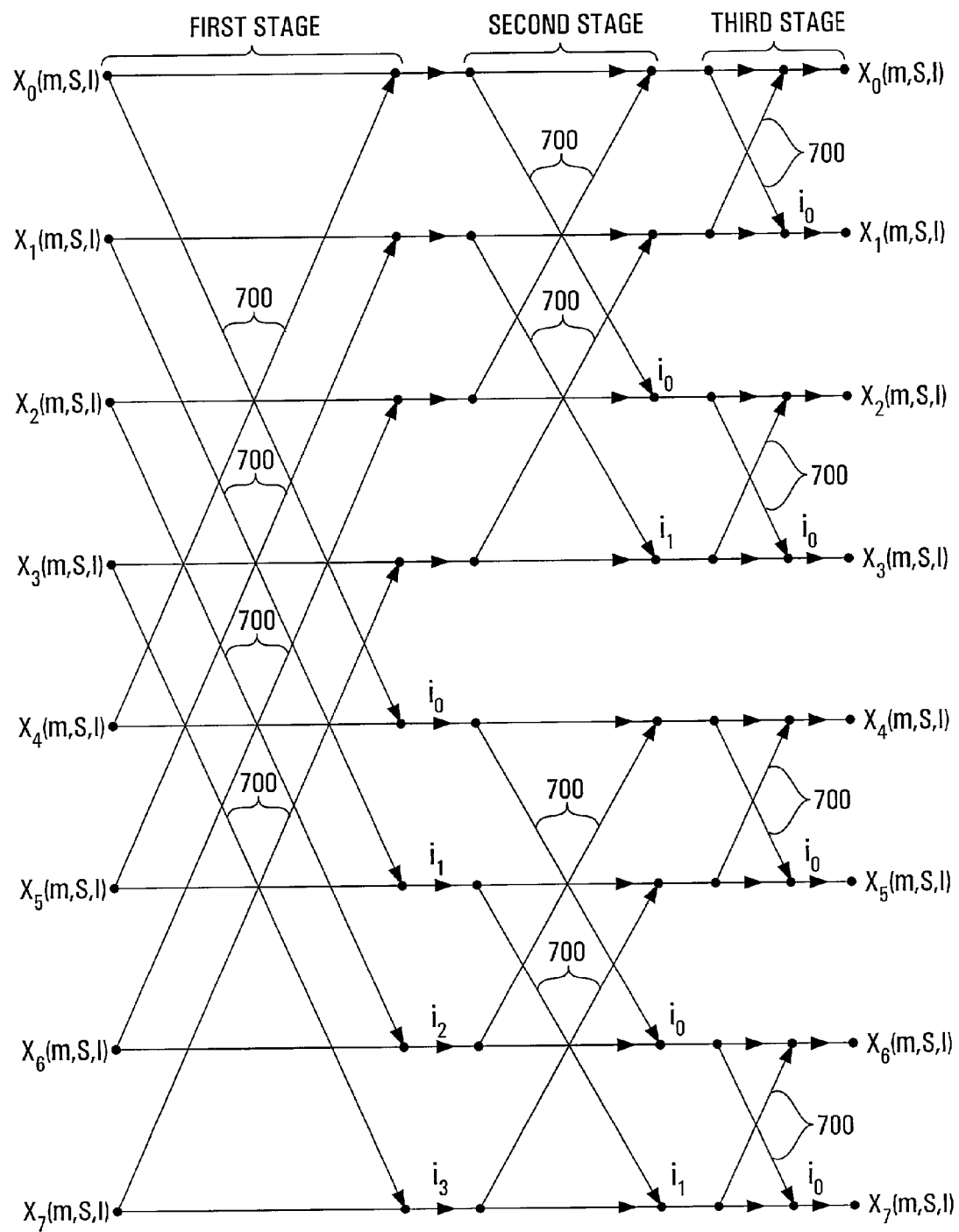
FIG. 5A is a diagram of one of the 3-stage FFT computations of FIG. 4B using DIF.

Referring to FIG. 4C, shown is a flow chart of a method of performing the 3-stage FFT computations of FIG. 4B. More particularly, shown is a flow chart of a method of performing 3-stage FFT computations for the set of 8 sub-sub-blocks of data, M, wherein $0 \leq M \leq M_1-1$. Iterations are performed (step 4C-1) for each one of $M_2$ 3-stage FFT computations of $2^S=2^3=8$ data points by repeating steps 4C-2 and 4C-3. For a 3-stage FFT computation, m, wherein $MM_2 \leq m \leq (M+1)M_2-1$, the 8 data points are imported from a respective one of the buffers 915, 916 into the high-speed cache 917 and existing data in the high-speed cache 917, from a previous one of the iterations of step 4C-1 is exported back to the external memory 18 (step 4C-2). A 3-stage FFT computation is then performed on the 8 data points of the 3-stage FFT computation, m (step 4C-3). The 3-stage FFT computation, m, of step 4C-3 is described with reference to FIG. 5A. In FIG. 5A, the data points 351 correspond to data points $X_0(m,S,I)$, $X_1(m,S,I)$, $X_2(m,S,I)$, $X_3(m,S,I)$, $X_4(m,S,I)$, $X_5(m,S,I)$, $X_6(m,S,I)$ and $X_7(m,S,I)$ of FIG. 5A where m is satisfies $MM_2 \leq m \leq (M+1)M_2-1$, S=3 for a 3-stage FFT computation and I is a whole number associated with the set of 3-stage FFT computations of step 3C-1. For the data points 351, m=0 and for the set of 3-stage FFT computations of step 3C-1, I=0.

Figure 5B:
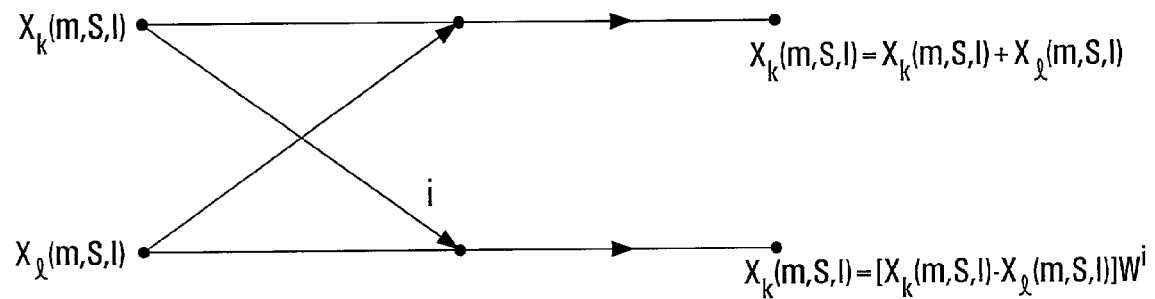
FIG. 5B is a diagram of one of 12 butterfly computations of the 3-stage FFT computation of FIG. 5A.

There are four butterflies 700 for each stage of the 3-stage butterfly arrangement of FIG. 5A. The butterflies 700 are computed using DIF as shown in FIG. 5B where new values of two data points $X_k(m,S,I)$ and $X_l(m,S,I)$ are given by $X_k(m,S,I)=X_k(m,S,I)+X_l(m,S,I)$ and $X'_l(m,S,I)=(X_k(m,S,I)-X_l(m,S,I)) W^i$ where $i=i_0, i_1, i_2$ or $i_3$ and $MM_2 \leq m \leq (M+1)M_2-1$. The values of $i_0, i_1, i_2$ and $i_3$ are given by $$i_0=m2^w$$
$$i_1=N/(2^Sw)+i_0$$
$$i_2=2N/(2^Sw)+i_0$$
$$i_3=3N/(2^Sw)+i_0 \quad (1)$$

where w=IS+1. As discussed above, the twiddle factors, $W^i$, are stored in the buffer 918.

After having performed a 3-stage FFT computation upon the data points 351 (step 4C-3), the index m is increased to m+1 (step 4C-1) and again with I=0 steps 4C-2 and 4C-3 are repeated for data points 352. Step 4C-2 and 4C-3 are repeated (step 4C-1) until all data points in sub-blocks 300 have undergone a 3-stage FFT computation.

Figure 4D:
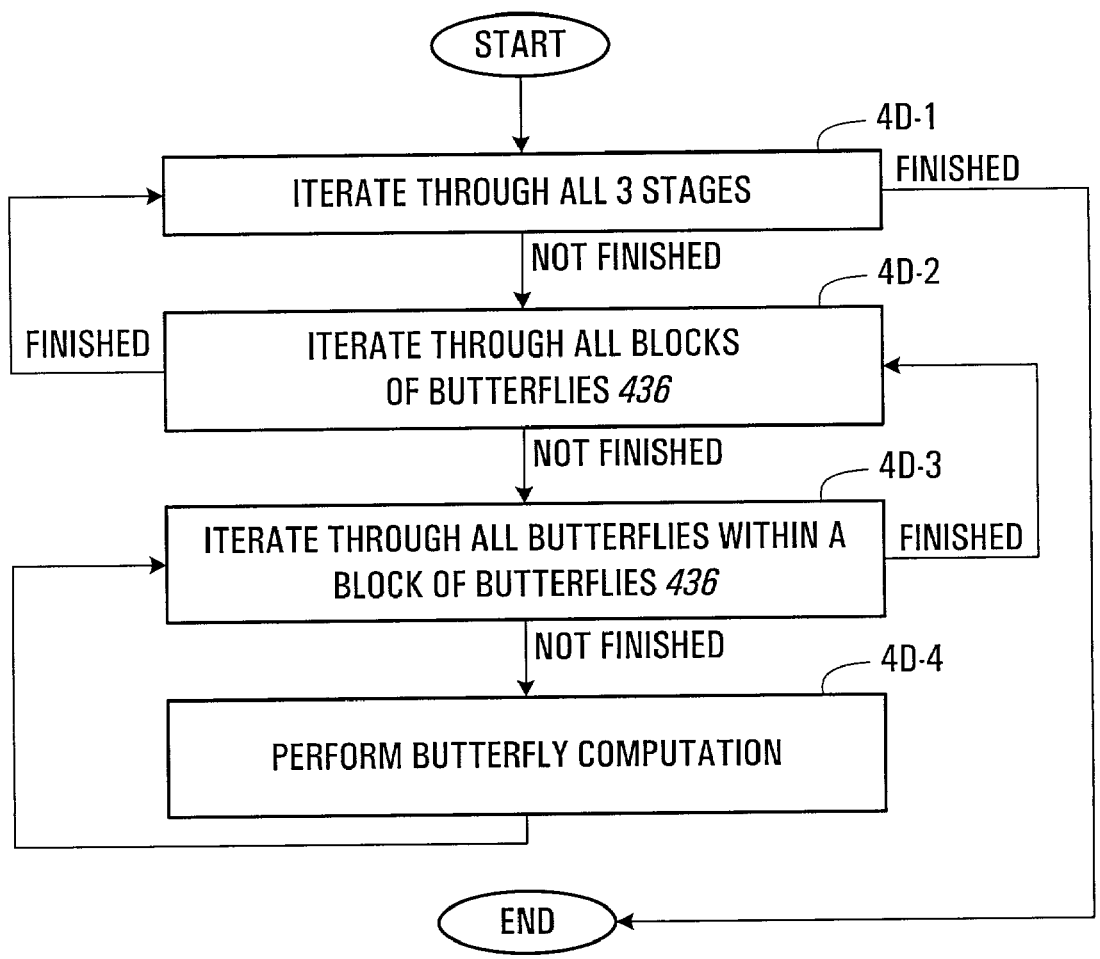
FIG. 4D is a flow chart of a method of performing the 3-stage FFT computations of FIG. 4B, provided by another embodiment of the invention.

Referring to FIG. 4D, shown is a flow chart of a method of performing the 3-stage FFT computations of FIG. 4B, provided by another embodiment of the invention. As shown in FIG. 4B the 3-stage FFT computations of step 4A-4 require butterfly computations in a first stage 705, a second stage 706 and a third stage 707. Within each one of the first stage 705, the second stage 706 and the third stage 707 are blocks of butterflies 436. Beginning with the first stage 705 iterations are performed for all stages (step 4D-1) by repeating step 4D-2. Within a respective one of the first stage 705, the second stage 706 and the third stage 707, iteration are performed for all blocks of butterflies 436 (step 4D-2) by repeating step 4D-3. Iterations are also performed for all butterflies within a respective one of the blocks of butterflies 436 (step 4D-3) by repeating step 4D-4. For a particular butterfly within the respective one of the blocks of butterflies 436 a butterfly computation is performed (step 4D-4).

Referring back to FIG. 3C, after the set of 3-stage FFT computations of step 3C-1 has been done, the set of 3-stage FFT computations of step 3C-2 is performed. Step 3C-2 will now be described in detail with reference to FIGS. 4A to 4D, 5A, 5B and 6B.

Figure 6B:
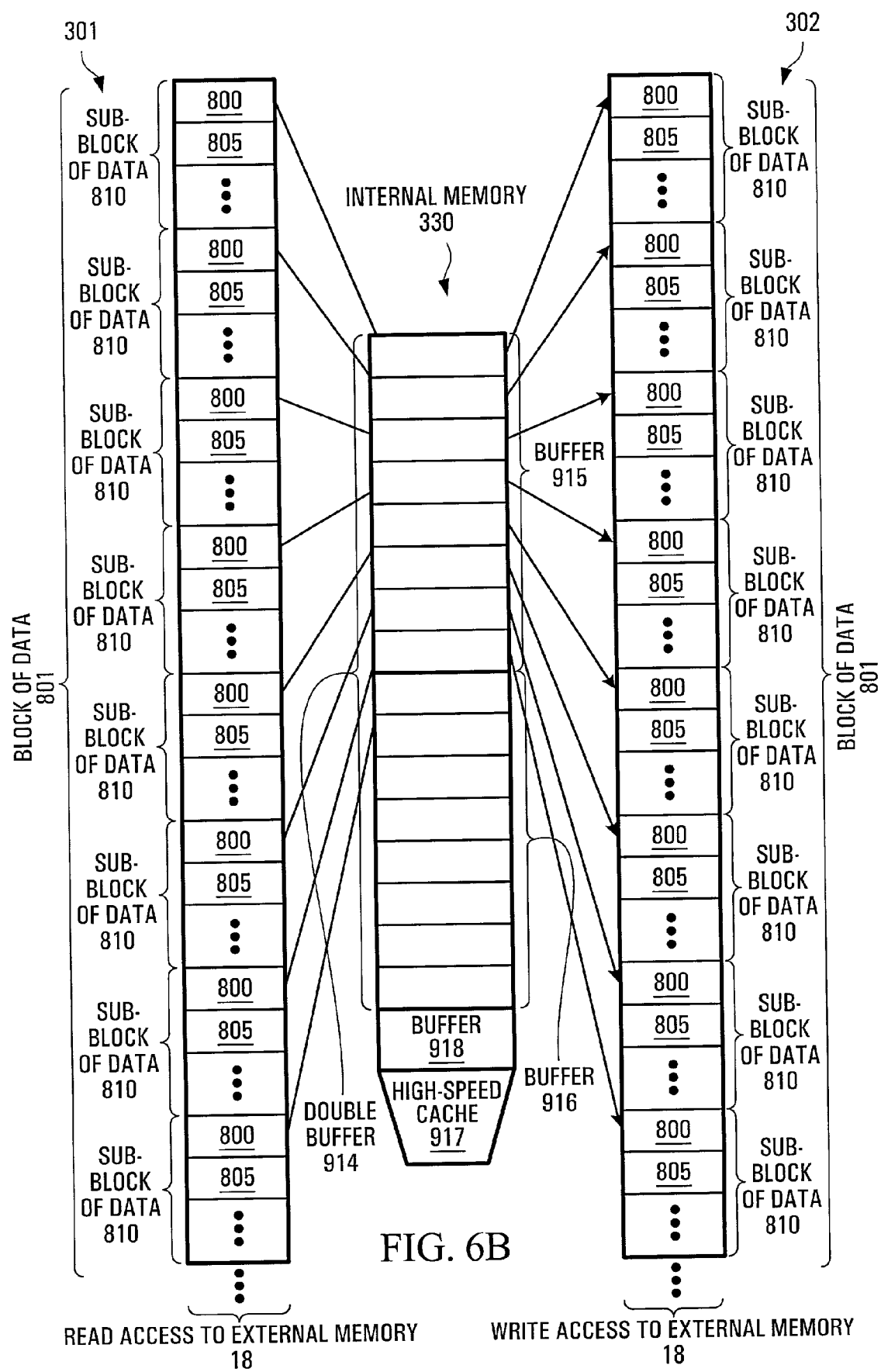
FIG. 6B is a diagram of sub-sub-blocks of data being of imported into the internal memory form the external memory and being exported from the internal memory back to the external memory, for another one of two sets of 3-stage FFT computations of FIG. 3C.

The method according to FIG. 4A for performing the set of the 3-stage FFT computations of step 3C-1 is also applied to the set of the 3-stage FFT computations of step 3C-2 except that the N data points must be grouped into a different number of blocks of data, sub-blocks of data and sub-sub-blocks of data at step 4A-1 to properly evaluate the following three stages of the 18-stage FFT computation. At step 4A-1, the N data points are grouped into $2^{IS}=2^{(1)(3)}=8$ blocks of data wherein I=1 for the set of 3-stage FFT computations of step 3C-2 and S=3 again for 3-stage FFT computations. In FIG. 6B, the external memory 18 carries the N data points with the N data points grouped into 8 blocks of data each carrying $N/2^{IS}=N/8$ data points. Only one block of data 801 is shown for clarity. The block of data 801 corresponds to a respective one of the sub-blocks of data 310 as shown in FIG. 6A. Within the block of data 801 the N/8 data points are grouped into 8 sub-blocks of data 810 of $N/2^{IS+S}=N/2^{(1)(3)+3}=N/64$ data points and each sub-block of data 810 has $M_1$ sub-sub-blocks of data of $M_2=0.5K$ data points (Only two sub-sub-blocks of data 800, 805 for each one of the sub-blocks of data 810 are shown for clarity). The sub-sub-blocks of data 800 form a set of $2^S=2^3=8$ sub-sub-blocks of data and the sub-sub-blocks of data 805 form another set of $2^S=2^3=8$ sub-sub-blocks of data. Combining all the sub-sub-blocks of data in this way results in $M_1$ sets of 8 sub-sub-blocks of data. Each one of the sub-blocks of data 810 contains $N/2^{IS+S}=256K/2^{(1)(3)+3}=4K$ data points, each one of the sub-sub-blocks of data 800, 805 contains $M_2=0.5K$ data points and $M_1=(N/8^2)/(0.5K)=8$.

In the method of FIG. 4A, iterations are performed for all 8 blocks of data (step 4A-2) by repeating step 4A-3. Iterations are also performed (step 4A-3) for all $M_1=8$ sets of 8 sub-sub-blocks of data by repeating steps 4A-4 to 4A-6. Steps 4A-4 to 4A-6 are the same as described above with reference to the set of 3-stage FFT computations of step 3C-1. Furthermore, the methods of performing the 3-stage FFT computations of step 4A-4 as described above with reference to FIGS. 4B to 4D, 5A and 5B also apply in this case except that in equation (1), I=1.

Figure 7A:
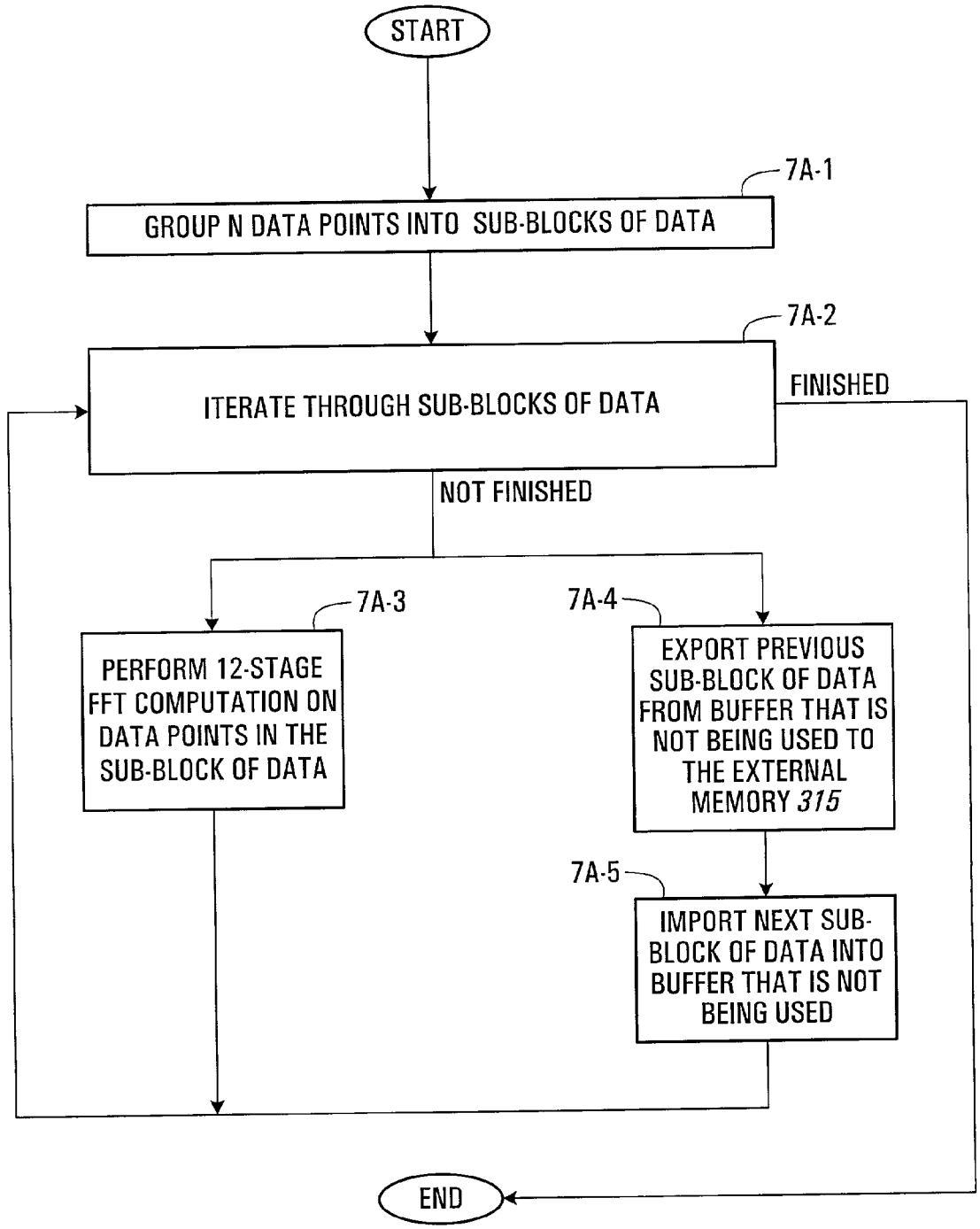
FIG. 7A is a flow chart of a method used to perform a set of 12-stage FFT computations of FIG. 3C.
Figure 7B:
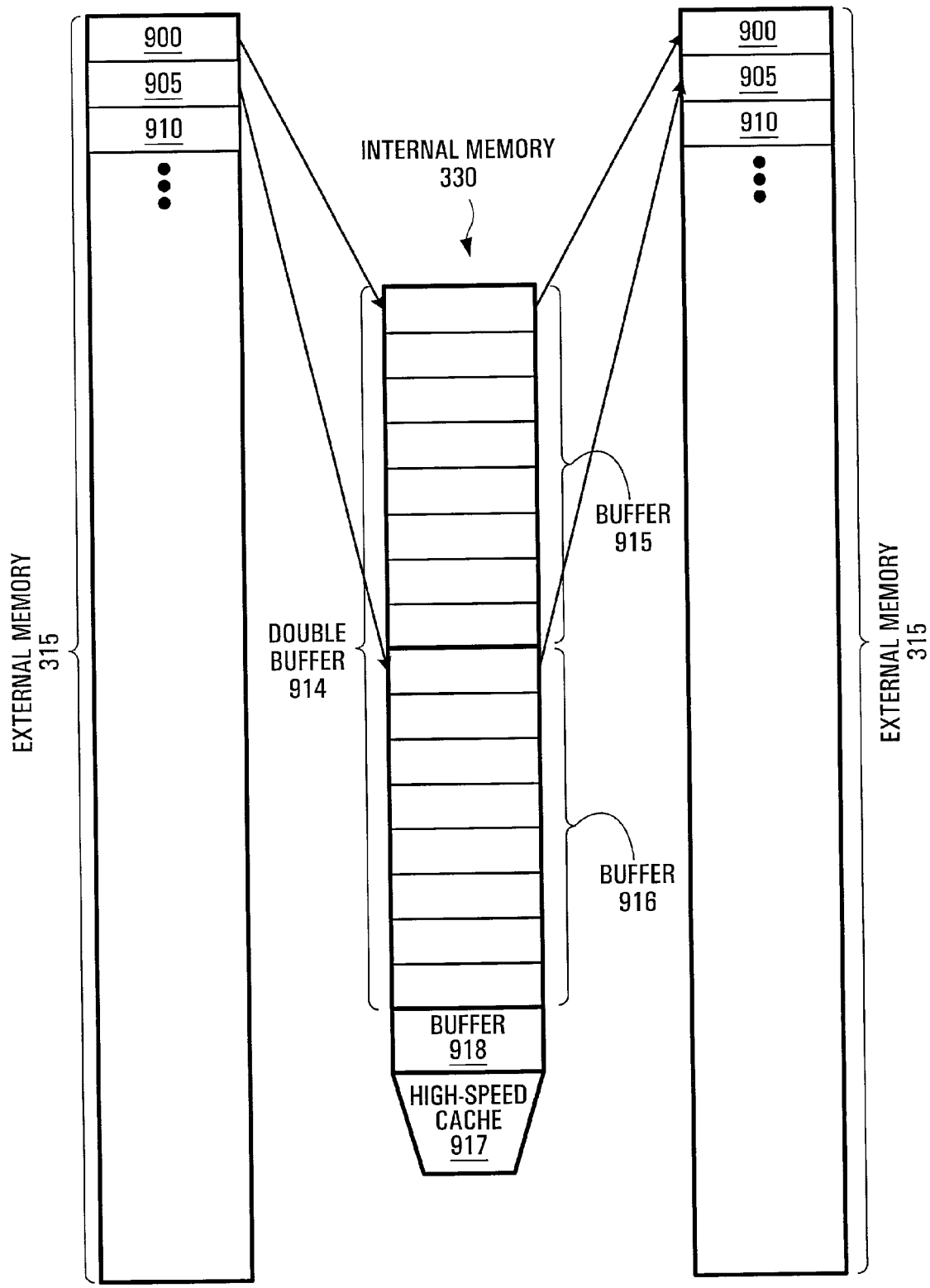
FIG. 7B is a diagram of sub-blocks of data being imported into the internal memory form the external memory and being exported from the internal memory back to the external memory, for the set of 12-stage FFT computations of FIG. 7A.

Referring back to FIG. 3C, a set of 12-stage FFT computations of step 3C-3 will now be described with reference to FIGS. 7A and 7B. Referring to FIG. 7A, shown is a flow chart of a method used to perform the set of 12-stage FFT computations of FIG. 3 (step 3C-3). The N=256K data points are grouped into $N/2^{12}=64$ sub-blocks of data of N/64=256K/64= 4K data points (step 7A-1). This is shown in FIG. 7B where only three sub-blocks of data 900, 905 and 910 are shown for clarity. Iterations are performed for all 64 sub-blocks of data (step 7A-2) by repeating steps 7A-3, 7A-4 and 7A-5. For each iteration of step 7A-2, a 12-stage FFT computation is performed on 4K data points in a respective one of the sub-blocks of data (step 7A-3). In some embodiments of the invention, the 12-stage FFT computation is any suitable conventional 12-stage FFT computation using DIF as described with reference to FIGS. 1D and 1E. In other embodiments of the invention, the 12-stage FFT computation is optimized for a specific architecture of the internal memory 330. This will be described in more detail below. While the 12-stage FFT computations of step 7A-3 are being performed, a previous sub-block of data is exported from one of the buffers 915, 916 which is not being used to the external memory 18 (step 7A-4). A next sub-block of data is imported from the external memory 18 into one of the buffers 915, 916 that is not being used (step 7A-5). As an example, in one iteration, a 12-stage FFT computation of step 7A-3 is performed on data points within the sub-block of data 905 residing in the buffer 916 while the sub-block of data 900 is being exported from the buffer 915 (step 7A-4) and the sub-block of data 910 is being imported into the buffer 915 (step 7A-5).

As discussed above, in some embodiments of the invention, the 12-stage FFT computation of step 7A-3 is optimized for a specific architecture of the internal memory 330. For example, in one embodiment of the invention, the high-speed cache 917 has 16 Kbytes of memory and an FFT computation of N' data point requires N'/2 twiddle Factors. In some embodiments of the invention, the number of required twiddle factors is decreased at the expense of more sophisticated programming code. A portion of the memory in the high-speed cache 917 must be reserved to store the N'/2 twiddle factors and another portion of the memory in the high-speed cache 917 must be reserved for an operating system. In some embodiments of the invention, the operating system requires 4 Kbytes of memory therefore the high speed cache 917 has a capacity to hold $M_C$=12 Kbytes/8 bytes=3/2K=3/2(1024) data points and twiddle factors of 8 bytes. To perform a FFT computation of N' data points so that the N' data points and the N'/2 twiddle factors all fit in the high-speed cache $M_C \geq (N'+N'/2)=3N'/2$ and therefore at most $N' \leq 2M_C/3 = 2(3/2)(1024)/3=2^{10}$. Consequently, the high-speed cache 917 can only fit data points and respective twiddle factors for a k'-stage FFT computation with $k' \leq \log_2(N')=\log_2(2^{10})=10$. Therefore, the high-speed cache cannot hold all $2^{12}$ data points of a 12-stage FFT computation. Consequently, the 12 stages of the 12-stage FFT computation of step 7A-3 are grouped into two sub-stage groupings of 6 stages. More particularly, the 12-stage FFT computation of step 7A-3 is performed by performing a set of 6-stage FFT computations for the first 6 stages of the 12-stage FFT computation and then performing another set of 6-stage FFT computations for the final 6 stages of the 12-stage FFT computation.

Figure 8A:
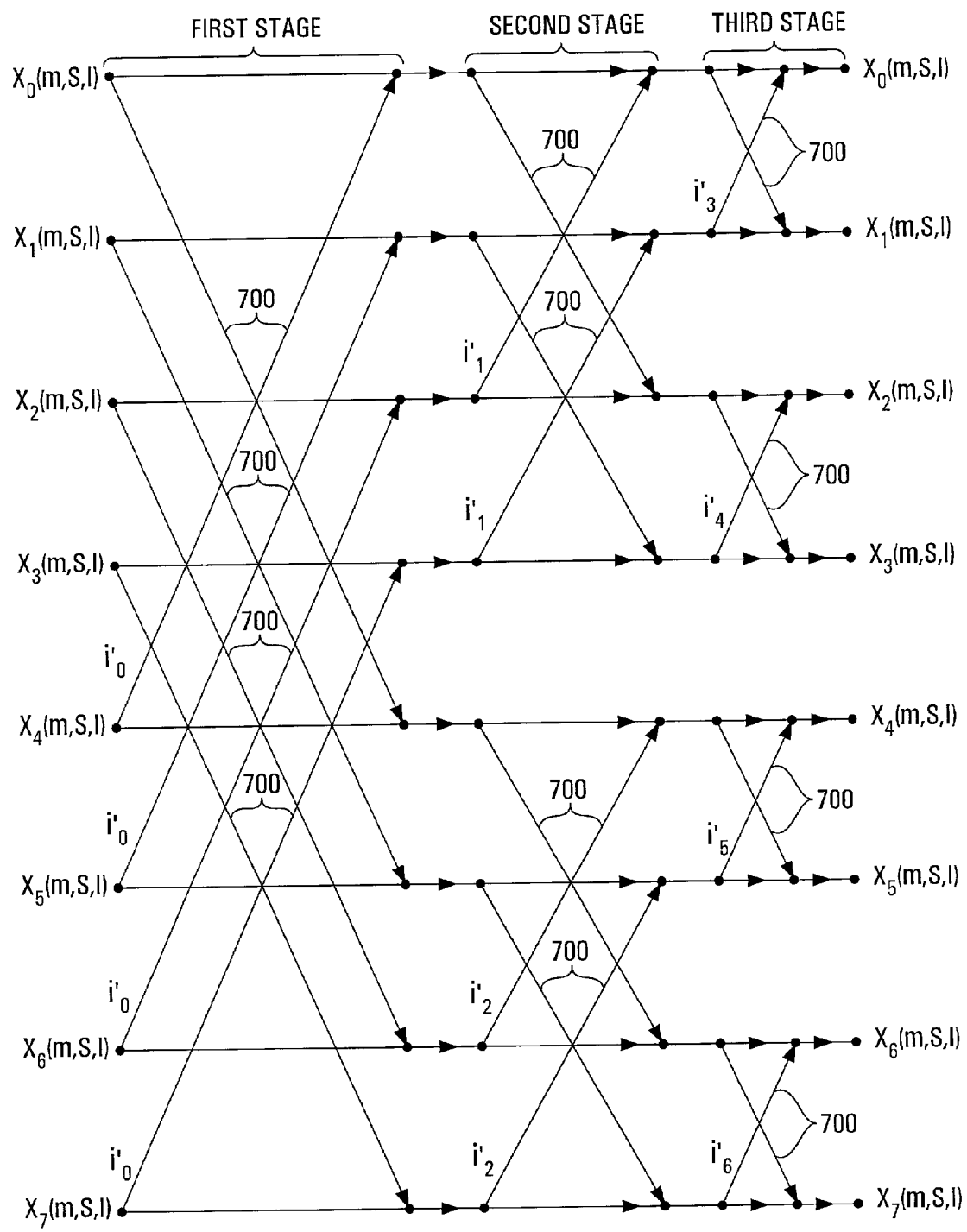
FIG. 8A is a diagram of one of the 3-stage FFT computations of FIG. 4B using decimation in time (DIT)
Figure 8B:
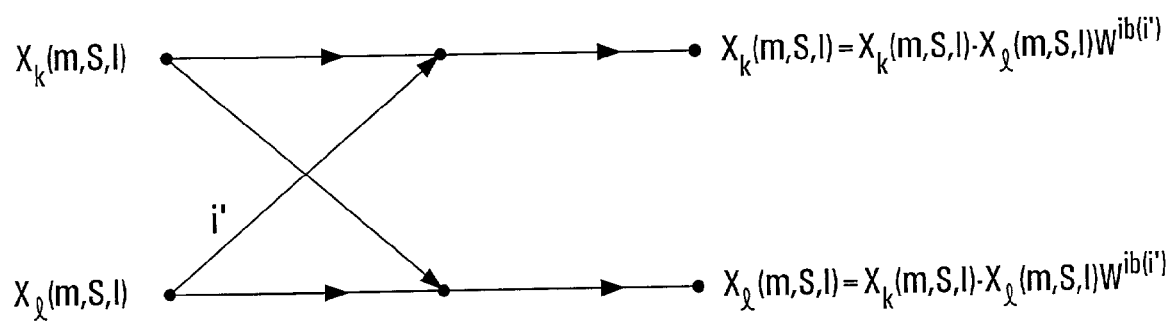
FIG. 8B is a diagram of one of 12 butterfly computations of the 3-stage FFT computation of FIG. 8A.

The invention has been described with respect to an 18-stage FFT computation that uses decimation in frequency. In other embodiments of the invention the sets of 3-stage FFT computations of steps 3C-1 and 3C-2 and the set of 12-stages FFT computations of step 3C-3 are performed using decimation in time (DIT). In DIT, the butterflies 700 of FIG. 5A are computed using DIT as shown in FIGS. 8A and 8B where the new values of $X_k(m,S,I)$ and $X_l(m,S,I)$ (k,l=0 to 7) are given by $X_k(m,S,I)=X_k(m,S,I)+X_l(m,S,I)\ W^{ib(i')}$ and $X_l(m,S,I)=X_k(m,S,I)-X_l(m,S,I)\ W^{ib(i')}$ where ib(i') is the bit reversal of i' where ib (i')=bit_reversal (i') and i'=i'$_0$, i'$_1$, i'$_2$, i'$_3$, i'$_4$, i'$_5$ and i'$_6$. The values of i'$_0$, i'$_1$, i'$_2$, i'$_3$, i'$_4$, i'$_5$ and i'$_6$ are given by $$i'_0 = w$$

$$i'_1 = 2w$$

$$i'_2 = 2w+1$$

$$i'_3 = 4w$$

$$i'_4 = 4w+1$$

$$i'_5 = 4w+2$$

$$i'_6 = 4w+3 \qquad (2)$$

where w=IS+1, S=3 for 3-stage FFT computations, I=0 for the set of 3-stage FFT computations of step 3C-1 and I=1 for the set of 3-stage FFT computations of step 3C-2.

Embodiments of the invention are not limited to embodiments in which N=256K and to an internal memory that has a double buffer of 64 Kbytes of memory for storing imported data points. Furthermore, embodiments of the invention are not limited to performing two sets of 3-stage FFT computations (steps 3C-1 and 3C-2) and then performing a set of 12-stage FFT computation (step 3C-3). In other embodiments of the invention N is an integral multiple of 2 and the internal memory holds $M_I$ data points. A N data point FFT computation requires a k-stage FFT computation with k=$\log_2$(N). In such embodiments, Q sets of S-stage FFT computations are performed and then a set of D-stage FFT computations are performed wherein k=QS+D with $0 \leq D \leq k-1$. In such an embodiment, the k stages of the k-stage FFT computation are grouped into Q stage groupings of S stages and one stage grouping of D stages. The set of D-stage FFT computations includes $N/2^D$ D-stages FFT computations and the D-stage FFT computations are any suitable conventional DIF or DIT D-stage FFT computations optimized for a specific architecture of the internal memory 330. In some embodiments, the internal memory 330 has a double buffer for storing imported data points and D=$\log_2$($M_I/2$) whereas in other embodiments the internal memory 330 has a single buffer for storing imported data points and D=$\log_2$($M_I$). Embodiments are not limited to D=$\log_2$($M_I/2$) or D=$\log_2$($M_I$). As discussed above k=QS+D and this equation is re-arranged as S=(k−D)/Q. In embodiments where the internal memory 330 has a double buffer for storing data points, values of Q and D are chosen such that D and S are integers and such that D is as close as possible to $\log_2$($M_I/2$) with D $\leq \log_2$($M_I/2$). In other embodiments where the internal memory 330 has a single buffer for storing data points values of Q and D are chosen such that D and S are integers and such that D is as close as possible to $\log_2$($M_I$) with D $\leq \log_2$($M_I$). Furthermore, the ratio of CPU processing times to data transfer times increases with increasing value of S and therefore performance increases with increasing value of S. However, when the ratio reaches a value of close to 1 the CPU processing times are comparable to the data transfer times and further increases in performance are no longer achieved with increasing value of S. The value for S is therefore preferably chosen to be large enough so that the CPU processing times are comparable to the data transfer times. Furthermore, in some embodiments of the invention there are no D-stage FFT computations being performed, D=0 and S=(k−D)/Q=k/Q. Consequently, in some embodiments of the invention $0 \leq D \leq \log_2(M_I)$ and in other embodiments $0 \leq D \leq \log_2(M_I/2)$. Limitations on Q and S are given by $1 \leq Q \leq k-1$ and $1 \leq S \leq k-1$. In another example, $N = 2^k = 2^{13}$ and the internal memory 330 has a single buffer for storing imported data points and has a capacity to hold $M_I = 2^{12}$ data points. In this example, $D = \log_2(M_I) = \log_2(2^{12}) = 12$ and from k=SQ+D, SQ=1 resulting in Q=1 and S=1.

Figure 9:
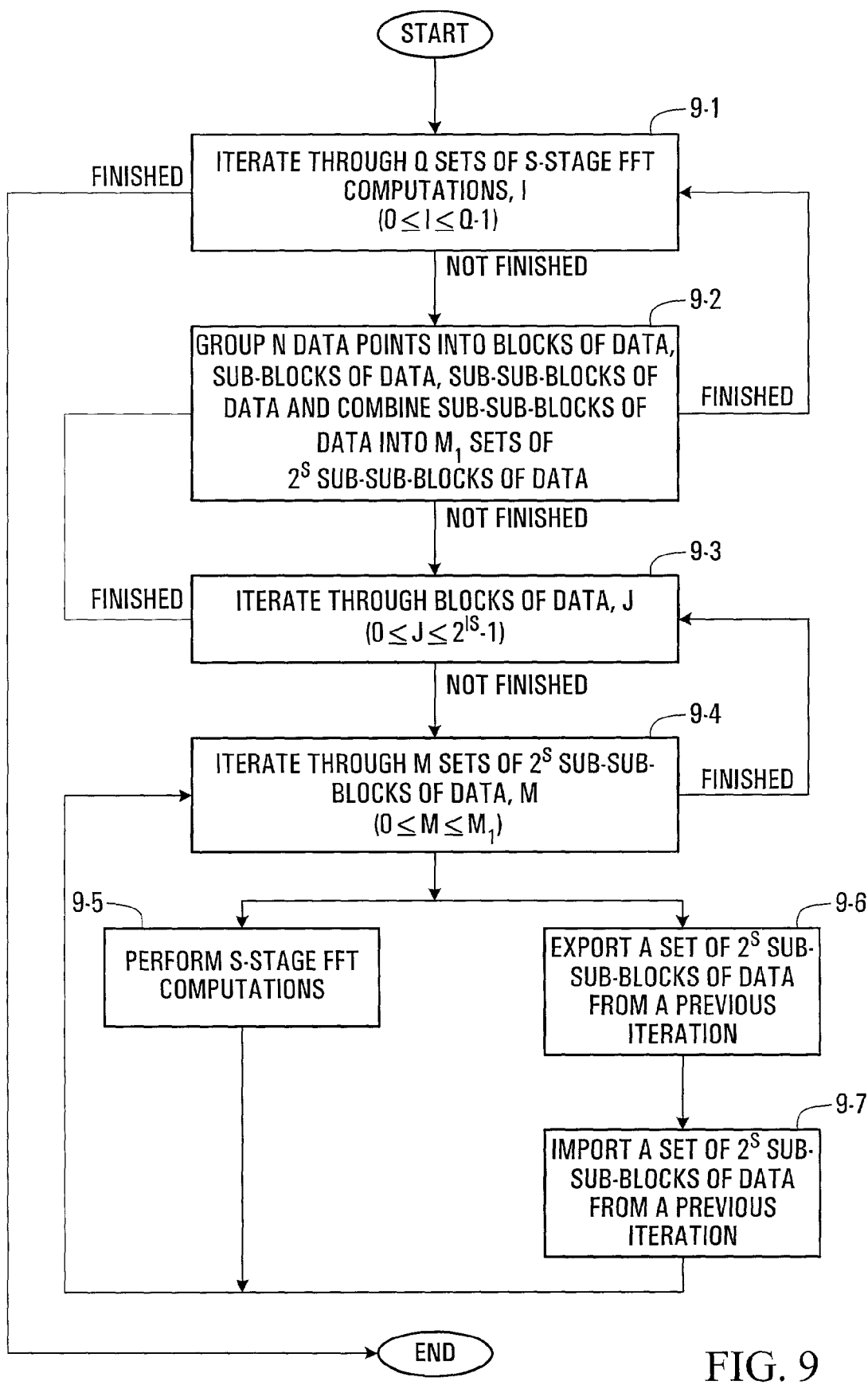
FIG. 9 is a flow chart of a method of performing Q sets of S-stage FFT computations, in another embodiment of the invention.

Referring to FIG. 9 shown is a flow chart of a method of performing Q sets of S-stage FFT computations in another embodiment of the invention. Beginning with a set of S-stage FFT computations, I, with I=0, of the Q sets of S-stage FFT computations, iterations are performed for all the Q sets of S-stage FFT computations ($0 \leq I \leq Q-1$) (step 9A-1) by repeating a step 9-2. Within the set of S-stage FFT computations, I, the N data points are grouped into blocks of data, sub-blocks of data, sub-sub-blocks of data and the sub-sub-blocks of data are combined into $M_1$ sets of $2^S$ sub-sub-blocks of data (step 9-2). More particularly, within the set of S-stage FFT computations, I, the N data points are grouped into $2^{IS}$ blocks of data, J ($0 \leq J \leq 2^{IS}-1$), wherein each block of data, J, contains $N/2^{IS}$ data points. Within each one of the blocks of data, J, the $N/2^{IS}$ data are grouped into $2^S$ sub-blocks of data wherein each sub-block of data contains $N/2^{IS+S}$ data points. Within each one of $2^S$ the sub-blocks of data of $N/2^{IS+S}$ data points, data points are grouped into $M_1$ sub-sub-blocks of data, M ($0 \leq M \leq M_1$), wherein each one of the sub-sub-block of data, M, contains $M_2 = N/(2^{IS+S}M_1)$ data points. In embodiments of the invention where the internal memory 330 has a double buffer for storing imported data points, $M_2 = M_I/2^{S+1}$ and $M_1 = N/(2^{IS+S}M_2) = N/(M_I 2^{IS-1})$. In other embodiments of the invention where the internal memory 330 has a single buffer for storing data points, $M_2 = M_I/2^S$ and $M_1 = (N/2^{IS+S}M_2) = N/(M_I 2^{IS})$. Respective ones of the sub-sub-blocks of data from within each one of $2^S$ the sub-blocks of data are combined to form the $M_1$ sets of $2^S$ sub-sub-blocks of data of $N/(2^{IS}M_1)$ data points. For example, as shown in FIG. 6B, the sub-sub-blocks of data 800 are combined into a set of $2^s = 2^3$ sub-sub-blocks of data.

Iterations are then performed for each one of the $2^{IS}$ blocks of data, J (step 9-3) by repeating a step 9-4. Iterations are also performed for each one of the $M_1$ sets of $2^S$ sub-sub-blocks of data (step 9-4) by repeating steps 9-5, 9-6 and 9-7. $M_2 = (N/2^{IS+S}M_1)$ S-stage FFT computations are then performed for data points within a set of $2^S$ sub-sub-blocks of data, M, as discussed above with reference to FIGS. 4B to 4D (step 9-5). While the S-stage FFT computations of step 9-5 are being performed, sub-sub-blocks of data from a previous iteration of step 9-4 are exported (step 9-6) from the internal memory 330 to the external memory 18 from one of the buffers 915, 916 that is not being used in step 9-5. A set of $2^S$ sub-sub-blocks of data, for a next iteration, is then imported (step 9-7) from the external memory 18 into one of the buffers 915, 916 that is not being used in step 9-5.

Embodiments of the invention are not limited to embodiments in which imports and exports of data points of steps 9-7 and 9-6, respectively, are performed while the S-stage FFT computations of step 9-5 are being performed. For example, in one embodiment of the invention, the internal memory 330 has a single buffer for storing imported data points and prior to performing S-stage FFT computations on a set of $2^S$ sub-sub-blocks of data, M, respective data points are imported into the internal memory 330 and after performing the S-stage FFT computations the respective data points are exported back to the external memory 18.

In some embodiments of the invention, the D-stage FFT computations are any suitable conventional D-stage FFT computation using DIF or DIT as described with reference to FIGS. 1D and 1E. In other embodiments of the invention, the D-stage FFT computation are optimized for a specific architecture of the internal memory 330. For example, in one embodiment of the invention, the high-speed cache 917 has a capacity to $M_C$ data points including respective twiddle factors for a k'-stage FFT computation. In one embodiment, the number of stages, k', in which all data points and respective twiddle factor can be simultaneously loaded into the high-speed cache 917 must satisfy $k' \leq \log_2(2M_C/3)$ wherein k' is an integer. Therefore, stages of the D stages of each of the D-stage FFT computations are grouped into sub-stage groupings of at least one stage but less than or equal to k' stages and a respective set of sub-stage FFT computation are performed for each one of the sub-stage groupings. The factor of ⅔ in $k' \leq \log_2(2M_C/3)$ is limited by the algorithm used to perform the FFT computations and in other embodiments, in which a different algorithm is used to perform the FFT computations, a different factor is used.

Numerous modifications and variations of the present invention are possible in light of the above teachings. It is therefore to be understood that within the scope of the appended claims, the invention may be practiced otherwise than as specifically described herein.

We claim:

1. A method of performing a k-stage FFT computation of N data points wherein k and N are integers, the method comprising: for each one of a plurality of stage groupings of at least one stage of k stages of the k-stage FFT computation wherein the plurality of stage groupings of at least one stage collectively comprise the k stages, performing a respective plurality of operations on the N data points, each one of the respective plurality of operations comprising: performing an import of a respective plurality of sets of data points of the N data points from an external memory into an internal memory; performing a FFT computation upon each one of the respective plurality of sets of data points of the N data points in the internal memory; and performing an export of the respective plurality of sets of data points of the N data points from the internal memory into the external memory to update the respective plurality of sets of data points of the N data points in the external memory; wherein the stage groupings of at least one stage comprise Q stage groupings each comprising S stages, said Q and said S being integers with $Q \geq 1$, $S \geq 1$ and $k \geq QS$; and wherein N substantially satisfies $N = 2^k$, comprising:

grouping, within a stage grouping, I, of the Q stage groupings wherein I is an integer satisfying $0 \leq I \leq Q-1$, the N data points into $2^{IS}$ blocks of data of $N/2^{IS}$ respective data points;

grouping, within each one of the $2^{IS}$ blocks of data, the $N/2^{IS}$ respective data points into $2^S$ sub-blocks of data of $N/2^{IS+S}$ respective data points;

grouping, within each one of the $2^S$ sub-blocks of data, the $N/2^{IS+S}$ respective data points into $M_1$ sub-sub-blocks of data of $N/(2^{IS+S}M_1)$ respective data points wherein $M_1$ is an integer;

taking, within each one of the $2^{IS}$ blocks of data, a respective sub-sub-block of data of the $M_1$ sub-sub-blocks of data from each one of the $2^S$ sub-blocks of data to form a set of $2^S$ sub-sub-blocks of data of N/($2^{IS}M_1$) data points a total of $M_1$ times to produce $M_1$ sets of $2^S$ sub-sub-blocks of data of N/($2^{IS}M_1$) data points;

taking, within each one of the $M_1$ sets of $2^S$ sub-sub-blocks of data, a respective data point from each one of the $2^S$ sub-blocks of data to form a set of $2^S$ data points a total of N/($2^{IS+S}M_1$) times to produce N/($2^{IS+S}M_1$) sets of $2^S$ data points;

wherein, for the stage grouping, I, of the of the Q stage groupings of the plurality of stage groupings, the performing a respective plurality of operations on the N data points comprises performing $M_1$ of the plurality of operations for each one of the $2^{IS}$ blocks of data within the stage grouping, I, each one of the $M_1$ of the plurality operations comprising:

performing an import of respective N/($2^{IS+S}M_1$) sets of $2^S$ data points from the external memory into the internal memory;

performing an S-stage FFT computation of the k-stage FFT computation upon each set of $2^S$ data points of the respective N/($2^{IS+S}M_1$) sets of $2^S$ data points in the internal memory;

performing an export of the respective N/($2^{IS+S}M_1$) sets of $2^S$ data points from the internal memory into the external memory to update the respective N/($2^{IS+S}M_1$) sets of $2^S$ data points in the external memory;

wherein the internal memory comprises a double buffer adapted to store the plurality of sets of data points, wherein the double buffer comprises two buffers each capable of storing $M_1/2$ data points and wherein said $M_1$ substantially satisfies $M_1 = N/(2^{IS-1}M_1)$, $M_1$ being an integer.

2. A method of performing a k-stage FFT computation according to claim 1 wherein $M_1$ substantially satisfies $M_1 = N/(2^{IS}M_1)$ wherein $M_1$ corresponds to the number of data points the internal memory is capable of holding.

3. A method of performing a k-stage FFT computation according to claim 1 wherein $M_1$ substantially satisfies $M_1 = N/(2^{IS-1}M_1)$ wherein $M_1$ corresponds to the number of data points a buffer in the internal memory is capable of holding.

4. A method of performing a k-stage FFT computation according to claim 1 wherein the performing an S-stage FFT computation of the k-stage FFT computation upon each set of $2^S$ data points of the respective N/($2^{IS+S}M_1$) sets of $2^S$ data points results in N/($2^{IS+S}M_1$) S-stage FFT computations, the N/($2^{IS+S}M_1$) S-stage FFT computations comprising performing one stage of S stages for each one of the N/($2^{IS+S}M_1$) S-stage FFT computations and iterating through the S stages.

5. A method of performing a k-stage FFT computation according to claim 1 wherein the performing an S-stage FFT computation of the k-stage FFT computation upon each set of $2^S$ data points of the respective N/($2^{IS+S}M_1$) sets of $2^S$ data points results in N/($2^{IS+S}M_1$) S-stage FFT computations, the N/($2^{IS+S}M_1$) S-stage FFT computations comprising performing computations for S stages of an S-stage FFT computation of one of the N/($2^{IS+S}M_1$) S-stage FFT computations before another S-stage FFT computation is performed on another of one of the N/($2^{IS+S}M_1$) S-stage FFT computations.

6. A processor comprising an internal memory adapted to store data; a DMA (direct memory access) unit adapted to import data into the internal memory and to export data from the internal memory; and a central processor unit (CPU) adapted to perform, for each one of a plurality of stage groupings of at least one stage of k stages of the k-stage FFT computation wherein the plurality of stage groupings of at least one stage collectively comprise the k stages, a respective plurality of operations on the N data points, for each one of the respective plurality of operations the CPU is adapted to: provide instructions to the DMA unit for performing an import of a respective plurality of sets of data points, of N data points, into the internal memory; perform a FFT computation upon each one of the respective plurality of sets of data points, of the N data points, in the internal memory; and provide instructions to the DMA unit for performing an export of the respective plurality of sets of data points, of the N data points, from the internal memory to update the respective plurality of sets of data points of the N data points, wherein the CPU is adapted to:

group, within a stage grouping, I, of the Q stage groupings wherein I is an integer satisfying $0 \leq I \leq Q-1$, the N data points into $2^{IS}$ blocks of data of $N/2^{IS}$ respective data points;

group, within each one of the $2^{IS}$ blocks of data, the $N/2^{IS}$ respective data points into $2^S$ sub-blocks of data of $N/2^{IS+S}$ respective data points;

group, within each one of the $2^S$ sub-blocks of data, the $N/2^{IS+S}$ respective data points into $M_1$ sub-sub-blocks of data of N/($2^{IS+S}M_1$) respective data points wherein $M_1$ is an integer;

take, within each one of the $2^{IS}$ blocks of data, a respective sub-sub-block of data of the $M_1$ sub-sub-blocks of data from each one of the $2^S$ sub-blocks of data to form a set of $2^S$ sub-sub-blocks of data of N/($2^{IS}M_1$) data points a total of $M_1$ times to produce $M_1$ sets of $2^S$ sub-sub-blocks of data of N/($2^{IS}M_1$) data points; and take, within each one of the $M_1$ sets of $2^S$ sub-sub-blocks of data, a respective data point from each one of the $2^S$ sub-blocks of data to form a set of $2^S$ data points a total of N/($2^{IS+S}M_1$) times to produce N/($2^{IS+S}M_1$) sets of $2^S$ data points;

wherein, for the stage grouping, I, of the of the Q stage groupings of the plurality of stage groupings, the CPU is adapted to perform $M_1$ of the plurality operations for each one of the $2^{IS}$ blocks of data within the stage grouping, I, and for each one of the $M_1$ of the plurality operations the CPU is adapted to: provide instructions to the DMA unit for performing an import of respective N/($2^{IS+S}M_1$) sets of $2^S$ data points into the internal memory;

performing an S-stage FFT computation of the k-stage FFT computation upon each set of $2^S$ data points of the respective N/($2^{IS+S}M_1$) sets of $2^S$ data points in the internal memory; and provide instructions to the DMA unit for performing an export of the respective N/($2^{IS+S}M_1$) sets of $2^S$ data points from the internal memory to update the respective N/($2^{IS+S}M_1$) sets of $2^S$ data points;

wherein the internal memory comprises a buffer adapted to store the plurality of sets of data points, wherein the buffer has a capacity to hold $M_1$ data points and $M_1$ substantially satisfies $M_1 = N/(2^{IS}M_1)$ wherein $M_1$ in an integer; and wherein the internal memory comprises a double buffer adapted to store the plurality of sets of data points, wherein the double buffer comprises two buffers each capable of storing $M_1/2$ data points and wherein said $M_1$ substantially satisfies $M_1 = N/(2^{IS-1}M_1)$, $M_1$ being an integer.

7. A processor according to claim 6 wherein while the CPU performs the S-stage FFT computation of the k-stage FFT computation upon each set of $2^S$ data points of the respective N/($2^{IS+S}M_1$) sets of $2^S$ data points, the respective $N/(2^{IS+S}M_1)$ sets of $2^S$ data points being stored in one of the two buffers, the CPU is adapted to provide instructions to the DMA unit to import, into another one of the two buffers, respective $N/(2^{IS+S}M_1)$ sets of $2^S$ data points of a next one of the each one of the $M_1$ of the plurality operations.

8. A processor according to claim 6 wherein while the CPU performs the S-stage FFT computation of the k-stage FFT computation upon each set of $2^S$ data points of the respective $N/(2^{IS+S}M_1)$ sets of $2^S$ data points, the respective $N/(2^{IS+S}M_1)$ sets of $2^S$ data points being stored in one of the two buffers, the CPU is adapted to provide instructions to the DMA unit to export, from another one of the two buffers, respective $N/(2^{IS+S}M_1)$ sets of $2^S$ data points from previous one of the each one of the $M_1$ of the plurality operations.

9. A processor according to claim 6 wherein the performing an S-stage FFT computation of the k-stage FFT computation upon each set of $2^S$ data points of the respective $N/(2^{IS+S}M_1)$ sets of $2^S$ data points results in $N/(2^{IS+S}M_1)$ S-stage FFT computations, the CPU being further adapted to evaluate the $N/(2^{IS+S}M_1)$ S-stage FFT computations at one stage of S stages for each one of the $N/(2^{IS+S}M_1)$ S-stage FFT computations and iterate through the S stages.

10. A processor according to claim 6 wherein the internal memory comprises a high-speed cache.

11. A processor according to claim 10 wherein the performing an S-stage FFT computation of the k-stage FFT computation upon each set of $2^S$ data points of the respective $N/(2^{IS+S}M_1)$ sets of $2^S$ data points results in $N/(2^{IS+S}M_1)$ S-stage FFT computations, the CPU being further adapted to perform computations for S stages of an S-stage FFT computation of one of the $N/(2^{IS+S}M_1)$ S-stage FFT computations before performing another S-stage FFT computation of another one of the $N/(2^{IS+S}M_1)$ S-stage FFT computations.

12. A processor according to claim 6 wherein the stage groupings of at least one stage comprise a stage grouping of D stage wherein D is an integer, said k substantially satisfying k=QS+D and said D substantially satisfying $D \leq \log_2(M_1)$.

13. A processor according to claim 6 wherein the stage groupings of at least one stage comprise a stage grouping of D stage wherein D is an integer, said k substantially satisfying k=QS+D and said D substantially satisfying $D \leq \log_2(M_1/2)$.

14. An article of manufacture comprising a computer readable medium storing computer readable program code means embodied therein for performing a k-stage FFT computation of N data points wherein k and N are integers, the computer readable code means in said article of manufacture comprising computer readable code FFT means for performing, for each one of a plurality of stage groupings of at least one stage of k stages of the k-stage FFT computation wherein the plurality of stage groupings of at least one stage collectively comprise the k stages, a respective plurality of operations on the N data points, for each one of the respective plurality of operations the computer readable code FFT means comprising computer readable code means for providing instructions for performing an import of a respective plurality of sets of data points of the N data points from an external memory into an internal memory; computer readable code means for performing a FFT computation upon each one of the respective plurality of sets of data points of the N data points in the internal memory; and computer readable code means for providing instructions for performing an export of the respective plurality of sets of data points of the N data points from the internal memory into the external memory to update the respective plurality of sets of data points of the N data points in the external memory, wherein the stage groupings of at least one stage comprise a stage grouping of D stage and Q stage groupings of S stages wherein D, Q and S are integers and wherein said k substantially satisfies k=QS+D and k=$\log_2(N)$, comprising further computer readable code means for:

grouping, within a stage grouping, I, of the Q stage groupings wherein I is an integer satisfying $0 \leq I \leq Q-1$, the N data points into $2^{IS}$ blocks of data of $N/2^{IS}$ respective data points;

grouping, within each one of the $2^{IS}$ blocks of data, the $N/2^{IS}$ respective data points into $2^S$ sub-blocks of data of $N/2^{IS+S}$ respective data points;

grouping, within each one of the $2^S$ sub-blocks of data, the $N/2^{IS+S}$ respective data points into $M_1$ sub-sub-blocks of data of $N/(2^{IS+S} M_1)$ respective data points wherein $M_1$ is an integer;

taking, within each one of the $2^{IS}$ blocks of data, a respective sub-sub-block of data of the $M_1$ sub-sub-blocks of data from each one of the $2^S$ sub-blocks of data to form a set of $2^S$ sub-sub-blocks of data of $N/(2^{IS}M_1)$ data points a total of $M_1$ times to produce $M_1$ sets of $2^S$ sub-sub-blocks of data of $N/(2^{IS}M_1)$ data points; and taking, within each one of the $M_1$ sets of $2^S$ sub-sub-blocks of data, a respective data point from each one of the $2^S$ sub-blocks of data to form a set of $2^S$ data points a total of $N/(2^{IS+S}M_1)$ times to produce $N/(2^{IS+S}M_1)$ sets of $2^S$ data points;

wherein, for the stage grouping, I, of the of the Q stage groupings of the plurality of stage groupings, the computer readable code FFT means is further adapted to perform $M_1$ of the plurality operations for each one of the $2^{IS}$ blocks of data within the stage grouping, I, and for each one of the $M_1$ of the plurality operations the computer readable code FFT means further comprising:

computer readable code means for providing instructions for performing an import of respective $N/(2^{IS+S}M_1)$ sets of $2^S$ data points from the external memory into the internal memory; computer readable code means for performing an S-stage FFT computation of the k-stage FFT computation upon each set of $2^S$ data points of the respective $N/(2^{IS+S}M_1)$ sets of $2^S$ data points in the internal memory; and computer readable code means for providing instructions for performing an export of the respective $N/(2^{IS+S}M_1)$ sets of $2^S$ data points from the internal memory into the external memory to update the respective $N/(2^{IS+S}M_1)$ sets of $2^S$ data points in the external memory.

* * * * *

UNITED STATES PATENT AND TRADEMARK OFFICE
CERTIFICATE OF CORRECTION

PATENT NO. : 6,963,892 B2
APPLICATION NO. : 10/025870
DATED : December 26, 2001
INVENTOR(S) : D. Jin et al.

It is certified that error appears in the above-identified patent and that said Letters Patent is hereby corrected as shown below:

Column 17, line 30, "$M_1/2$" is corrected to read as --$M_I/2$--.

Column 17, line 31, "$M_1 = N/(2^{IS-1}M_1), M_1$" is corrected to read as --$M_I = N/(2^{IS-I}M_I), M_I$--.

Column 17, line 35, "$M_1 = N/(2^{IS}M_1)$ wherein $M_1$" is corrected to read as --$M_I = N/(2^{IS}M_I)$ wherein $M_I$--.

Column 17, line 39, "$M_1 = N/(2^{IS}M_1)$ wherein $M_1$" is corrected to read as --$M_I = N/(2^{IS}M_I)$ wherein $M_I$--.

Column 18, line 55, "$M_1$" is corrected to read as --$M_I$--.

Column 18, line 56, "$M_1 = N/(2^{IS}M_1)$ wherein $M_1$" is corrected to read as --$M_I = N/(2^{IS}M_I)$ wherein $M_I$--.

Column 18, line 61, "$M_1/2$" is corrected to read as --$M_I/2$--.

Column 19, line 38, "$D \leq \log_2(M_1)$" is corrected to read as --$D \leq \log_2(M_I)$--.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 6,963,892 B2
APPLICATION NO. : 10/025870
DATED : November 8, 2005
INVENTOR(S) : D. Jin et al.

It is certified that error appears in the above-identified patent and that said Letters Patent is hereby corrected as shown below:

Column 17, line 30, "$M_1/2$" is corrected to read as --$M_I/2$--.

Column 17, line 31, "$M_1 = N/(2^{IS-1}M_1)$, $M_1$" is corrected to read as --$M_I = N/(2^{IS-I}M_I)$, $M_I$--.

Column 17, line 35, "$M_1 = N/(2^{IS}M_1)$ wherein $M_1$" is corrected to read as --$M_I = N/(2^{IS}M_I)$ wherein $M_I$--.

Column 17, line 39, "$M_1 = N/(2^{IS}M_1)$ wherein $M_1$" is corrected to read as --$M_I = N/(2^{IS}M_I)$ wherein $M_I$--.

Column 18, line 55, "$M_1$" is corrected to read as --$M_I$--.

Column 18, line 56, "$M_1 = N/(2^{IS}M_1)$ wherein $M_1$" is corrected to read as --$M_I = N/(2^{IS}M_I)$ wherein $M_I$--.

Column 18, line 61, "$M_1/2$" is corrected to read as --$M_I/2$--.

Column 19, line 38, "$D \leq \log_2(M_1)$" is corrected to read as --$D \leq \log_2(M_I)$--.

This certificate supersedes the Certificate of Correction issued September 16, 2008.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 6,963,892 B2  
APPLICATION NO. : 10/025870  
DATED : November 8, 2005  
INVENTOR(S) : D. Jin et al.

Page 1 of 1

It is certified that error appears in the above-identified patent and that said Letters Patent is hereby corrected as shown below:

Column 17, line 30, "$M_1/2$" is corrected to read as --$M_I/2$--.

Column 17, line 31, "$M_1 = N/(2^{IS-1}M_1)$, $M_1$" is corrected to read as --$M_I = N/(2^{IS-1}M_I)$, $M_I$--.

Column 17, line 35, "$M_1 = N/(2^{IS}M_1)$ wherein $M_1$" is corrected to read as --$M_I = N/(2^{IS}M_I)$ wherein $M_I$--.

Column 17, line 39, "$M_1 = N/(2^{IS-1}M_1)$ wherein $M_1$" is corrected to read as --$M_1 = N/(2^{IS-1}M_I)$, wherein $M_I$--.

Column 18, line 55, "$M_1$" is corrected to read as --$M_I$--.

Column 18, line 56, "$M_1 = N/(2^{IS}M_1)$ wherein $M_I$" is corrected to read as --$M_1 = N/(2^{IS}M_I)$ wherein $M_I$--.

Column 18, line 61, "$M_1/2$" is corrected to read as --$M_I/2$--.

Column 18, line 62, "$M_1=N/(2^{IS-1}M_1)$, $M_1$" is corrected to read as --$M_1=N/(2^{IS-1}M_I)$, $M_I$--.

Column 19, line 38, "$D\leq\log_2(M_1)$" is corrected to read as --$D\leq\log_2(M_I)$--.

This certificate supersedes the Certificates of Correction issued September 16, 2008 and October 7, 2008.

Signed and Sealed this  
Twenty-fifth Day of January, 2011

David J. Kappos  
*Director of the United States Patent and Trademark Office*